US012106285B2

(12) United States Patent
Rule et al.

(10) Patent No.: US 12,106,285 B2
(45) Date of Patent: Oct. 1, 2024

(54) SYSTEMS AND METHODS TO PERFORM CONTACTLESS CARD ACTIVATION

(71) Applicant: Capital One Services, LLC, McLean, VA (US)

(72) Inventors: Jeffrey Rule, Chevy Chase, MD (US); Daniel Herrington, New York, NY (US); Rajko Ilincic, Annandale, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/941,346

(22) Filed: Sep. 9, 2022

(65) Prior Publication Data

US 2023/0004953 A1    Jan. 5, 2023

Related U.S. Application Data

(63) Continuation of application No. 17/684,864, filed on Mar. 2, 2022, now abandoned, which is a continuation of application No. 17/132,473, filed on Dec. 23, 2020, now Pat. No. 11,461,764, which is a continuation of application No. 16/731,178, filed on Dec. 31, 2019, now Pat. No. 10,909,527, which is a
(Continued)

(51) Int. Cl.
| | |
|---|---|
| *H04L 9/00* | (2022.01) |
| *G06Q 20/34* | (2012.01) |
| *G06Q 20/40* | (2012.01) |
| *H04L 9/32* | (2006.01) |
| *G06Q 20/10* | (2012.01) |
| *G06Q 20/20* | (2012.01) |

(52) U.S. Cl.
CPC ........ *G06Q 20/354* (2013.01); *G06Q 20/352* (2013.01); *G06Q 20/409* (2013.01); *H04L 9/321* (2013.01); *G06Q 20/1085* (2013.01); *G06Q 20/20* (2013.01); *G06Q 2220/00* (2013.01)

(58) Field of Classification Search
CPC .............. G06Q 2220/00; G06Q 20/20; G06Q 20/1085; G06Q 20/409; G06Q 20/352; G06Q 20/354; H04L 9/321
USPC ......................................................... 705/41
See application file for complete search history.

(56) References Cited

U.S. PATENT DOCUMENTS

| | | | | |
|---|---|---|---|---|
| 6,834,795 | B1 * | 12/2004 | Rasmussen | G06F 21/33 |
| | | | | 235/380 |
| 10,477,393 | B2 * | 11/2019 | Lopez | G06Q 20/322 |
| 10,489,781 | B1 | 11/2019 | Osborn | |

(Continued)

FOREIGN PATENT DOCUMENTS

| | | |
|---|---|---|
| CN | 109155032 A | 1/2019 |
| CN | 109891455 A | 6/2019 |

(Continued)

*Primary Examiner* — Josnel Jeudy
(74) *Attorney, Agent, or Firm* — KDW FIRM PLLC

(57) ABSTRACT

Example embodiments relate to performing activation techniques for contactless cards. For example, embodiments may include performing a near-field communication (NFC) exchange with a contactless card, processing a message comprising data to activate the contactless card, communicating the data to a server to activate the contactless card; and receiving a response from the server, the response to indicate whether the contactless card is successfully activated or not successfully activated.

20 Claims, 15 Drawing Sheets

Related U.S. Application Data continuation-in-part of application No. 16/205,119, filed on Nov. 29, 2018, now Pat. No. 10,581,611.

(60) Provisional application No. 62/740,352, filed on Oct. 2, 2018.

(56) References Cited

U.S. PATENT DOCUMENTS

| | | | |
|---|---|---|---|
| 10,909,527 B2 | 2/2021 | Rule | |
| 2008/0029607 A1 | 2/2008 | Mullen | |
| 2009/0070691 A1* | 3/2009 | Jain | G06Q 20/20 715/762 |
| 2009/0270077 A1* | 10/2009 | Fiorini | H04L 67/34 455/414.1 |
| 2015/0019442 A1* | 1/2015 | Hird | H04W 12/041 726/30 |
| 2015/0127545 A1 | 5/2015 | Bonalle et al. | |
| 2016/0180306 A1 | 6/2016 | Koeppel | |
| 2016/0364938 A1* | 12/2016 | Miranda | G06Q 20/3263 |
| 2017/0075671 A1* | 3/2017 | Mu | H04L 67/025 |
| 2017/0154328 A1 | 6/2017 | Zarakas | |
| 2017/0308895 A1* | 10/2017 | Srivastava | G06Q 20/3821 |
| 2018/0034862 A1 | 2/2018 | Friend | |
| 2018/0189527 A1* | 7/2018 | Kim | G06K 7/10297 |
| 2019/0347888 A1* | 11/2019 | Agbeyo | G07D 7/0043 |
| 2020/0220719 A1* | 7/2020 | Chaudhari | H04L 9/0822 |

FOREIGN PATENT DOCUMENTS

| | | | |
|---|---|---|---|
| JP | 2006190175 A | 7/2006 | |
| KR | 20130138659 A | 12/2013 | |
| KR | 20150141128 A * | 12/2015 | G06Q 50/22 |
| KR | 20160134627 A | 11/2016 | |
| KR | 20170139896 A | 12/2017 | |
| KR | 20190110337 A | 9/2019 | |
| TW | 201040844 A | 11/2010 | |
| WO | 2018011630 A1 | 1/2018 | |

\* cited by examiner

SYSTEMS AND METHODS TO PERFORM CONTACTLESS CARD ACTIVATION

CROSS-REFERENCE TO RELATED APPLICATIONS

This application is a continuation of U.S. patent application Ser. No. 17/684,864 filed on Mar. 2, 2022, which is a continuation of U.S. patent application Ser. No. 17/132,473, filed on Dec. 23, 2020, which is a continuation of U.S. patent application Ser. No. 16/731,178, filed Dec. 31, 2019, which is a continuation-in-part of U.S. patent application Ser. No. 16/205,119, filed on Nov. 29, 2018 (now U.S. Pat. No. 10,581,611), which claims priority from U.S. Provisional Application No. 62/740,352, filed on Oct. 2, 2018, the disclosures of which are incorporated herein by reference in their entirety.

FIELD OF THE INVENTION

The present disclosure relates to authentication and authorization, and more particularly, to system and methods for reissuing or otherwise altering information stored on contactless cards.

BACKGROUND

Data breaches that reveal customer payment information are increasingly common and becoming more extensive, with many millions of credit card numbers revealed in a given breach. These data breaches may be caused when an illicit actor breaks into computing systems associated with a major department store, bank, or credit card issuer, and steals a large amount of payment data (e.g., including credit card numbers, expiration dates, etc.)

Conventionally, a credit card issuer might respond to such a breach by reissuing the affected cards. This involves assigning new credit card numbers to a user's account, generating a new physical card with the new number embossed on it, writing a new magnetic stripe, and placing the card in the mail. When the breach is widespread (involving a large number of cards), it can take several weeks or months for users to receive their new cards. In the interim, they may not be able to use their account to make payments, since it is likely that the card number was voided at the time the breach was discovered (in order to prevent unauthorized access to the account). Clearly, this can be problematic for a customer.

The reissue process can also be expensive from the perspective of the card issuer, which often absorbs the cost of generating and mailing the new cards. Depending on the quality of the card stock, it may cost between $2 and $30 to create a new card. If the cards need to be reissued on an expedited basis, the additional processing costs may run to $10 per card. When several million card numbers have been compromised, the resulting reissue cost can run to tens of millions of dollars.

DETAILED DESCRIPTION OF EXAMPLE EMBODIMENTS

Figure 1A:
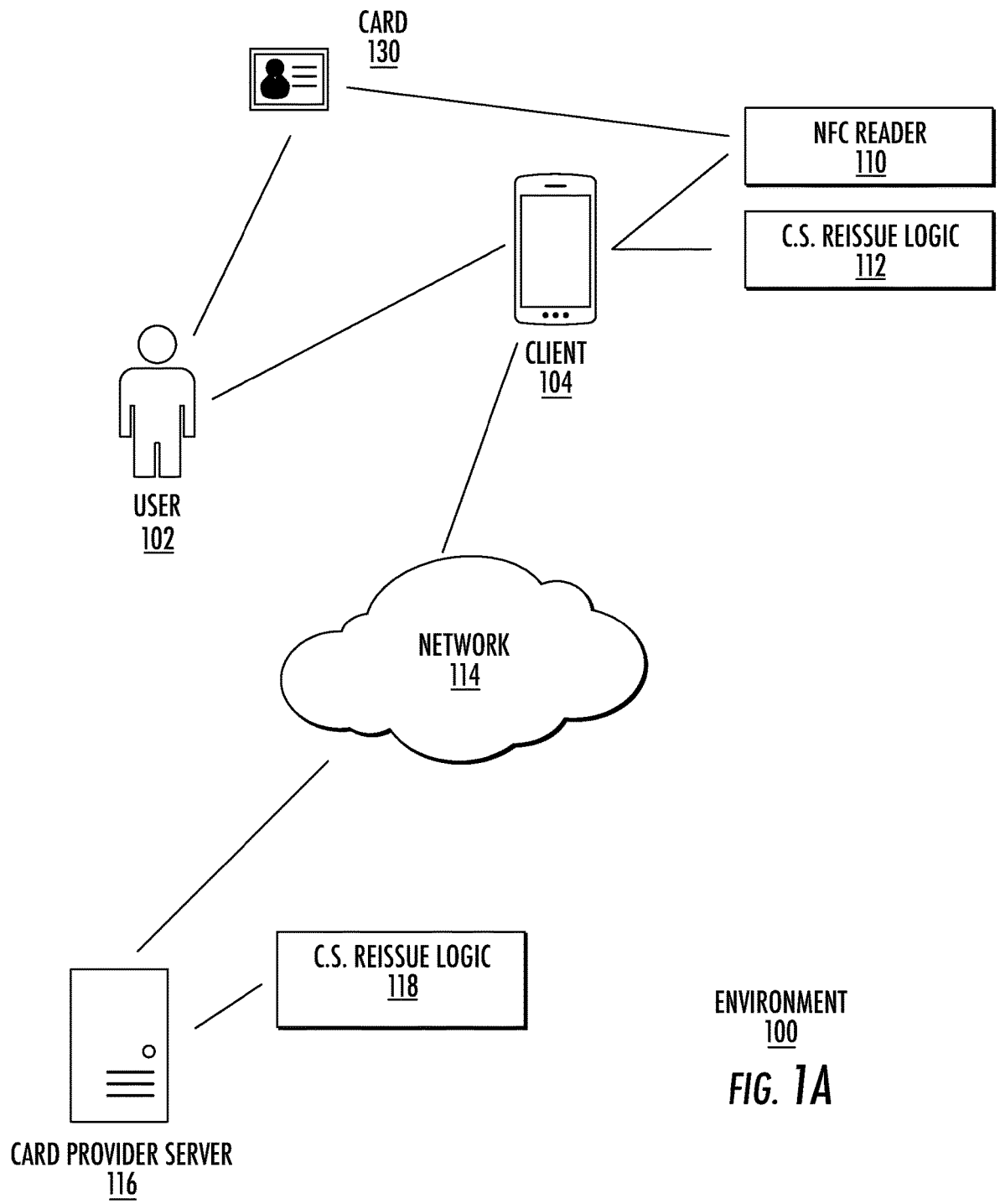
FIG. 1A depicts an environment suitable for use with exemplary embodiments.

Exemplary embodiments provide techniques for securely reissuing or otherwise altering the information stored on a contactless card based on a remote command. Accordingly, the number associated with the card can be quickly changed so that the card can continue to be used with the new number. If the card has the number printed or embossed on its face, then the printed number (and/or a number stored on a magnetic stripe) may not match the number stored on the contactless chip; nonetheless, the card can be used for contactless payments until a new card with a new number can be issued. In some embodiments, the card may include an electronic ink (e-ink) display that displays the number; in this case, the e-ink display may also be updated when the number stored on the card's contactless chip is updated.

The card's chip may include one or more applets that are activated under certain circumstances. For example, when making a payment with the card, a payment applet may be activated and may supply the card's number to a requesting device. In order to use the card with a new number, this payment applet may need to be updated, but for security purposes the payment applet may be restricted from communicating directly with an external source. For this purpose, the chip may include a second encryption and authorization applet responsible for communicating card information to and from external sources. The second applet may perform authentication and may ensure that information transmitted from the payment applet is done so in a secure way (e.g., using encryption). The second applet may also be responsible for performing validation functions (e.g., validating the counter stored on the card), as described in more detail below. According to exemplary embodiments, this second applet may be made to serve as a bridge between the external source and the payment applet, causing the number on the payment applet to be rewritten based on secure, internal (to the chip) communications.

In some cases, the second applet may be directly instructed to overwrite the card's number with a new number. For example, a mobile device running the Android operating system can issue a near field communications (NFC) write command to the second applet to trigger the second applet to issue a rewrite command to the payment applet. However, some devices may not support such communications (Apple's iOS is one such example). Accordingly, the second applet may also or alternatively be configured to recognize a predefined pattern that will cause the rewrite command to be issued. For example, a user may tap their contactless card to an NFC reader five times in less than a minute. Because tapping the card to the NFC reader triggers the authentication and encryption operations of the second applet, the second applet can be preconfigured to recognize this predefined pattern and issue the rewrite command in response.

In various embodiments, the card may have capabilities for limiting the number of rewrites of the number that may be performed (e.g., over the life of the card, or during a particular period of time). To that end, the card may maintain a counter of the number of rewrites, and may further store a value representing a maximum number of allowable rewrites. If a request to rewrite the number is received and the number of total requests (previous and current) exceeds the stored maximum value, the rewrite may be canceled.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. The description of embodiments should facilitate understanding of the invention to such an extent that other implementations, not specifically covered but within the knowledge of a person of skill in the art having read the description of embodiments, would be understood to be consistent with an application of the invention.

FIG. 1A illustrates a data transmission environment 100 according to an example embodiment. As further discussed below, system 100 may include contactless card 130, a client device 104, a network 114, and a server 116 maintained by the provider of the contactless card 130. Although FIG. 1A illustrates a particular configuration of components, one of ordinary skill in the art will understand that other configurations including more or fewer components, or components in another configuration, may be used.

The environment 100 may include one or more contactless cards 130, which are further explained below with reference to FIG. 1B. In some examples, a contactless card 130 may be in wireless communication, for example NFC communication, with the client device 104. The contactless card may include a contactless chip (see FIG. 1C). The contactless chip may maintain a copy of the primary account number (PAN) associated with the card 130, which may be read by a reader (such as the NFC reader 110).

The environment 100 may include a client device 104, which may be a network-enabled computer. As referred to herein, a network-enabled computer may include, but is not limited to: e.g., a computer device, or communications device including, e.g., a server, a network appliance, a personal computer (PC), a workstation, a mobile device, a phone, a handheld PC, a personal digital assistant (PDA), a thin client, a fat client, an Internet browser, or other device. The client device 104 also may be a mobile device; for example, a mobile device may include an iPhone, iPod, iPad from Apple® or any other mobile device running Apple's iOS operating system, any device running Microsoft's Windows® Mobile operating system, and/or any other smartphone or like wearable mobile device.

The client device 104 and/or the contactless card 130 may be associated with a user 102, which may be the owner of the contactless card. The user 102 may define credentials for accessing a mobile application on the client device 104, which may be an application associated with a service provider of the contactless card.

In various examples according to the present disclosure, the client device 104 of the environment 100 may execute one or more applications, such as software applications. The software applications may enable network communications with one or more components of the environment 100 and may transmit and/or receive data. Among other computer-executable logic, the client device 104 may include client-side reissue logic 112 (such as the logic depicted in more detail in connection with FIG. 6B).

The client device 104 may be in communication with one or more servers 116 via one or more networks 114. For example, the client device 104 and may operate as a front-end to a card provider server 116, which is responsible for maintaining security for the contactless card 130. In some embodiments, the card provider server 116 may also authorize transactions conducted via the card 130. The client device 104 may transmit, for example from a mobile device application executing on client device 104, one or more requests to the server 116. Similarly, the server 116 can communicate with the client device 104 to cause the client device 104 to begin the card reissue process, such as when a data breach occurs.

To that end, the server 116 may instruct the client device 104 to change the PAN associated with the user 102's card 130. The client device 104 may receive the instruction and inform the user 102 (e.g., via a display such as the one depicted in FIGS. 2A-2B) that the card's number is being reissued. The client device 104 may cause one or more applets stored on the card 130 to be activated, such as by an express command (e.g., an NFC write command) or by requesting that the user 102 tap the card 130 against the NFC reader 110 in a predetermined pattern (e.g., a predetermined number of times, a predetermined rate over a period of time, in a predetermined pattern, etc.).

The instruction to change the PAN may be sent from the server 116 on an individualized basis (e.g., when a single user 102's card 130 is compromised), or a reissue instruction may be broadcast to a group of recipients (as might be done in the event of a large data breach).

In some embodiments, the client 104 (or another device instructing the card 130 to change the PAN) may issue a change instruction to the card 130 in coordination with the server 116. For example, the server 116 may furnish a new PAN to be used on the card 130, which the client 104 may communicate to the communication logic/applet on the card 130. In another example, the payment logic/applet on the card 130 may be pre-programmed with multiple PANs, and the server 116 may identify which PANs to use (or, if the PANs are arranged in a list in the memory of the card, the server 116 may instruct the payment logic/applet to skip over a certain number of options and select the $n^{th}$ PAN in the list). In another example, the payment logic/applet may be capable of deriving a new PAN from the old PAN (or another identifier stored on the card, such as an identifier associated with the user 102 or an account of the user at a financial institution), and the server 116 may provide instructions relating to how to derive the new PAN or may provide seed numbers to be used in the generation of the new PAN.

If the client device 104 is capable of issuing a write request directly to the card 130, the write request may include information received from the server (e.g., the new PAN, the number of PANs in the list to skip, the generation technique for deriving the new PAN, or the seed for the new PAN). If the client device 104 cannot issue such a write request, then the card 130 can still coordinate with the server 116, albeit potentially in a more limited way. For example, if the communication logic/applet on the card 130 is configured to recognize a predetermined tapping pattern as an instruction to change the PAN, as noted above, then different patterns may be associated with different change instructions. For example, if the user taps the card 130 against the NFC reader 110 five times in less than a minute, then this may be interpreted as an instruction to advance to the next PAN stored in the list. On the other hand, if the user taps the card 130 only four times against the NFC reader 110 in less than a minute, then this may be interpreted as an instruction to jump ahead two PANs in the list. The instruction from the server 116 to the client device 104 may identify the particular pattern to be used, and the client device 104 may display an appropriate instruction on a user interface. If multiple different patterns are programmed into the communication logic/applet on the card 130, the device 104 may request that the user confirm the pattern to ensure that the correct pattern is used (e.g., by asking the user to tap in the predefined pattern, waiting momentarily, and then asking that the user confirm the change by tapping in the same predefined pattern again).

Once the PAN is changed, the communication logic/applet on the card 130 may report a success back to the server 116. The success may identify the new PAN that has been selected (either directly, by reporting the PAN or an encrypted version of the PAN, or indirectly, such as by transmitting a hash of the PAN or subset of the PAN). If the updated PAN does not match the PAN expected by the server 116, then the PAN may be voided and the process may be repeated. Alternatively, the server 116 can simply accept the PAN as reported by the card 130.

In some examples, the server 116 may include one or more processors, which are coupled to memory. The server 116 may be configured as a central system, server or platform to control and call various data at different times to execute a plurality of workflow actions.

Figure 1B:
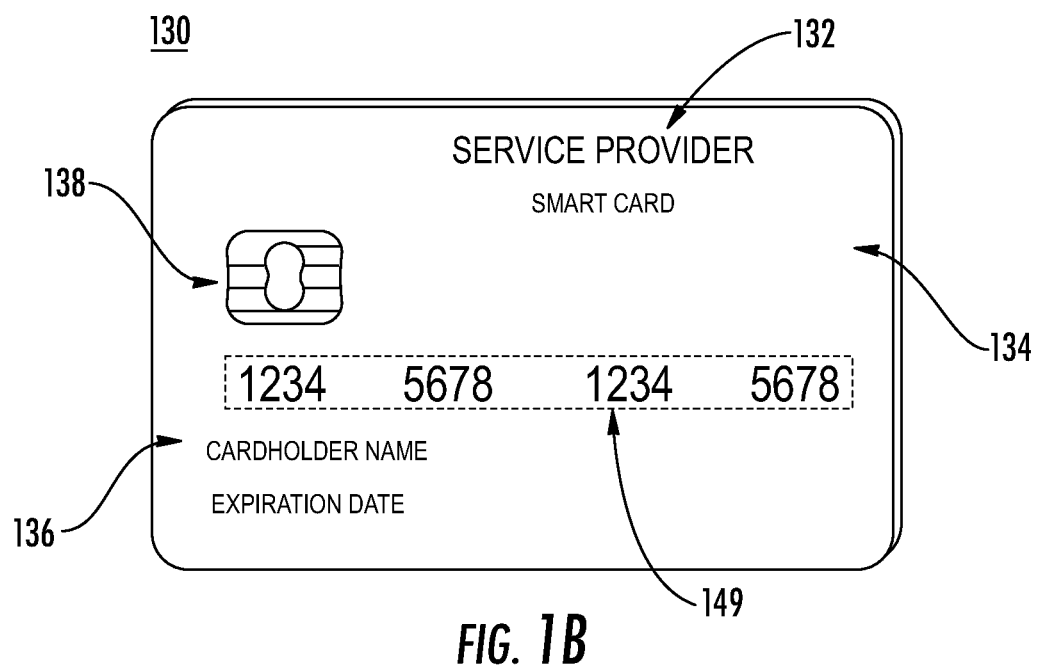
FIG. 1B depicts an example of a contactless card having a physical token.

FIG. 1B illustrates one or more contactless cards 130, which may comprise a payment card, such as a credit card, debit card, or gift card, issued by a service provider 132 displayed on the front or back of the card 130. In some examples, the contactless card 130 is not related to a payment card, and may comprise, without limitation, an identification card. In some examples, the payment card may comprise a dual interface contactless payment card. The contactless card 130 may comprise a substrate 134, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 130 may have physical characteristics compliant with the ID-1 format of the ISO/IEC 7810 standard, and the contactless card may otherwise be compliant with the ISO/IEC 14443 standard. However, it is understood that the contactless card 130 according to the present disclosure may have different characteristics, and the present disclosure does not require a contactless card to be implemented in a payment card.

The contactless card 130 may also include identification information 136 displayed on the front and/or back of the card. In some embodiments, the identification information 136 may be printed or embossed directly on the card. Optionally, an e-ink display 149 (or another type of rewritable display, employing technology such as a liquid crystal diode) may be provided for displaying some or all of the identification information 136. For example, the e-ink display 149 may display the card number associated with the card. The e-ink display 149 may be powered by a magnetic field, such as a magnetic field emanating from the client device 104. The antennae of the card 130 (e.g., the antenna of the contact pad 138, discussed below) may collect power from the magnetic field and power the e-ink display 149 when the card 130 is in close proximity to the client device 104. This allows the e-ink display 149 to be changed to match the new number provisioned to the applet on the card 130 by the client device 104, as discussed herein.

The contactless card 130 may further include a contact pad 138. The contact pad 138 may be configured to establish contact with another communication device, such as a user device, smart phone, laptop, desktop, or tablet computer. The contactless card 130 may also include processing circuitry, antenna and other components not shown in FIG. 1C. These components may be located behind the contact pad 138 or elsewhere on the substrate 134. The contactless card 130 may also include a magnetic strip or tape, which may be located on the back of the card (not shown in FIG. 1B).

Figure 1C:
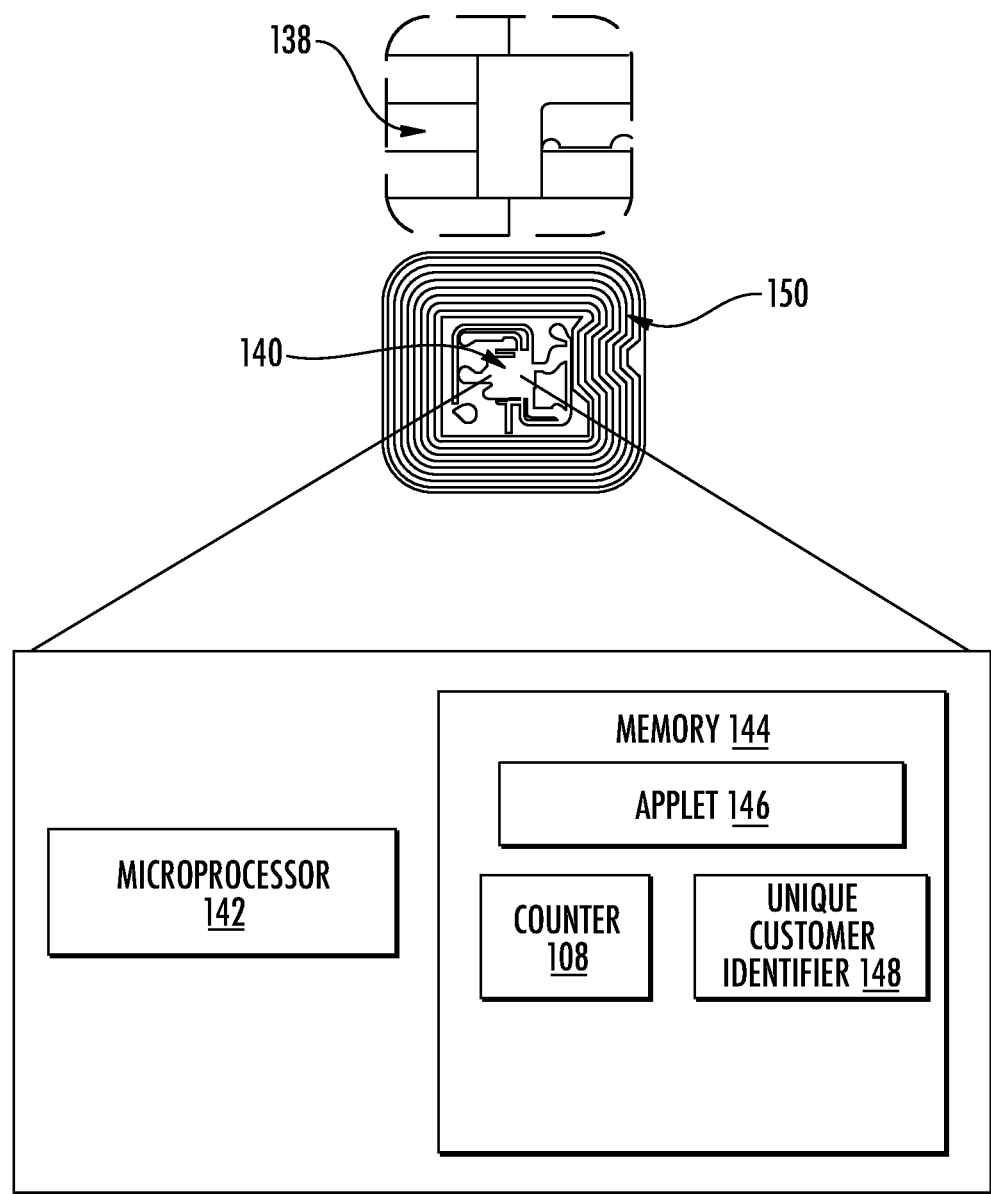
FIG. 1C depicts the structure of an exemplary physical token.

As illustrated in FIG. 1C, the contact pad 138 of FIG. 1B may include processing circuitry 140 for storing and processing information, including a microprocessor 142 and a memory 144. It is understood that the processing circuitry 140 may contain additional components, including processors, memories, error and parity/CRC checkers, data encoders, anticollision algorithms, controllers, command decoders, security primitives and tamperproofing hardware, as necessary to perform the functions described herein.

The memory 144 may be a read-only memory, write-once read-multiple memory or read/write memory, e.g., RAM, ROM, and EEPROM, and the contactless card 500 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times.

The memory 144 may be configured to store one or more applets 146, one or more counters 108, and a customer identifier 148. The one or more applets 146 may comprise one or more software applications configured to execute on one or more contactless cards, such as Java Card applet. However, it is understood that applets 146 are not limited to Java Card applets, and instead may be any software application operable on contactless cards or other devices having limited memory. The one or more counters 108 may comprise a numeric counter sufficient to store an integer. The customer identifier 148 may comprise a unique alphanumeric identifier assigned to a user of the contactless card 130, and the identifier may distinguish the user of the contactless card from other contactless card users. In some examples, the customer identifier 148 may identify both a customer and an account assigned to that customer and may further identify the contactless card associated with the customer's account.

The applets 146 may include a payment applet configured to conduct payment transactions with the card 130. The payment applet may be responsible for maintaining, or may make use of, the card's Primary Account Number (PAN), which may be communicated from the card as part of a transaction. The applets 146 may further include an authentication and/or encryption applet that is invoked when an outside source (such as the client device 104, a point of sale terminal, an automatic teller machine, etc.) attempts to establish communication with the card 130 (such as when the contact pad 138 is placed against, or in proximity to, a reader such as the NFC reader 110). The payment applet may not communicate directly with outside sources (i.e., sources external to the processing circuitry 140), but may be capable of securely communicating with another applet on the processing circuitry 140, such as the authentication and encryption applet. Information may be passed from the payment applet to the authentication and encryption applet for communication off-card.

Optionally, the payment applet may come pre-loaded (e.g., at the time the card is issued) with predefined PANs, one of which is designated as the currently active PAN and the remainder of which are held in reserve. When the applet is called upon to issue a new PAN, the applet may select the next PAN in the list and designate it as the active PAN. Alternatively, the applet may randomly generate a new PAN in accordance with PAN generation rules, or may generate a new PAN based off of the previous PAN.

The processor and memory elements of the foregoing exemplary embodiments are described with reference to the contact pad, but the present disclosure is not limited thereto. It is understood that these elements may be implemented outside of the pad 138 or entirely separate from it, or as further elements in addition to processor 142 and memory 144 elements located within the contact pad 138.

In some examples, the contactless card 130 may comprise one or more antennas 150. The one or more antennas 150 may be placed within the contactless card 130 and around the processing circuitry 140 of the contact pad 138. For example, the one or more antennas 150 may be integral with the processing circuitry 140 and the one or more antennas 150 may be used with an external booster coil. As another example, the one or more antennas 150 may be external to the contact pad 138 and the processing circuitry 142.

In an embodiment, the coil of contactless card 130 may act as the secondary of an air core transformer. The terminal may communicate with the contactless card 130 by cutting power or amplitude modulation. The contactless card 130 may infer the data transmitted from the terminal using the gaps in the contactless card's power connection, which may be functionally maintained through one or more capacitors. The contactless card 130 may communicate back by switching a load on the contactless card's coil or load modulation. Load modulation may be detected in the terminal's coil through interference.

As explained above, the contactless cards 130 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange (NDEF) requests, from a reader, such as a mobile NFC reader, and produce an NDEF message that comprises a cryptographically secure OTP encoded as an NDEF text tag.

Figure 2A:
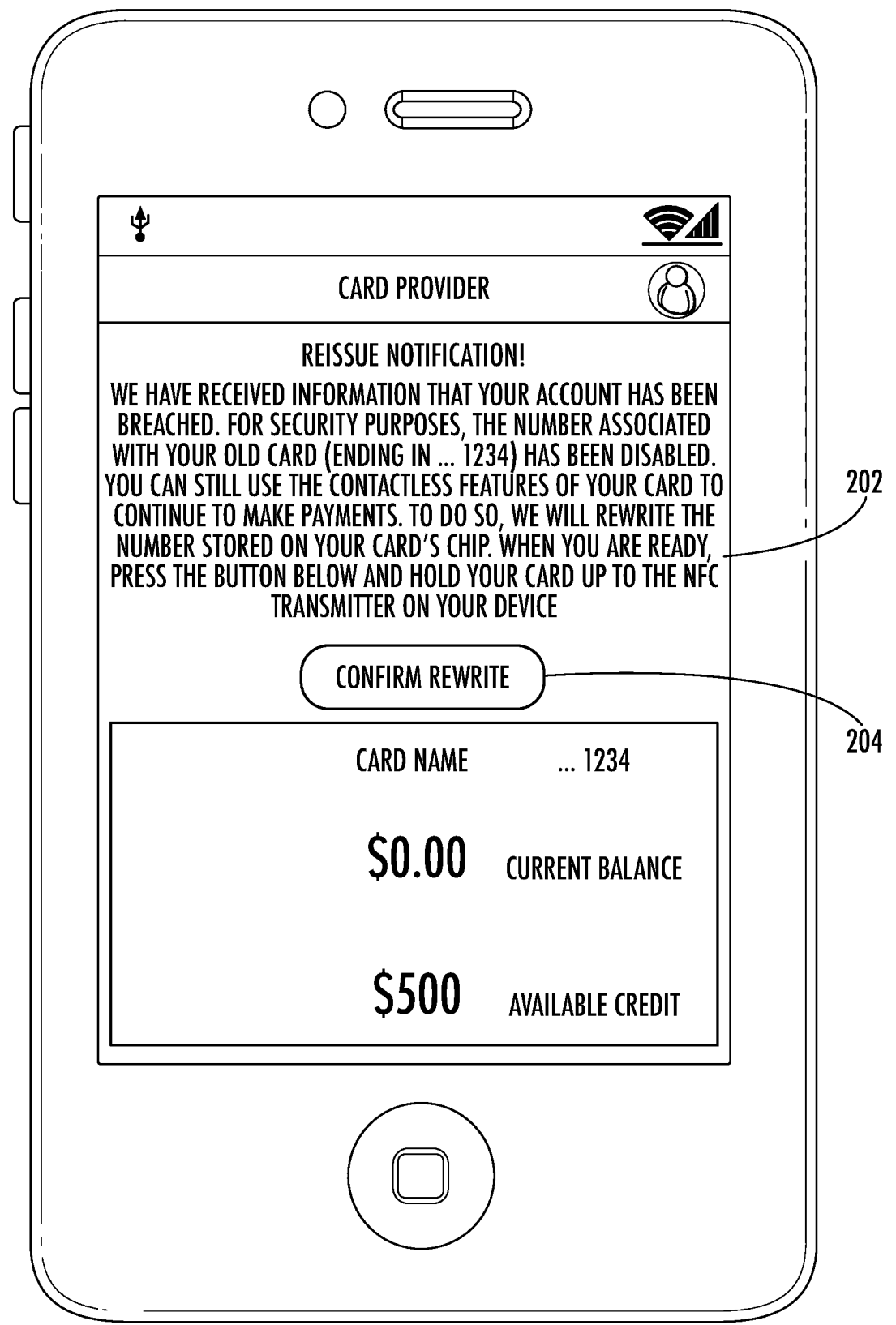
FIG. 2A depicts an exemplary interface for a mobile application associated with an owner of a contactless card.
Figure 2B:
FIG. 2B depicts an exemplary interface when the physical token is read by a reader on the owner's mobile device.

As noted above, exemplary transactions may validate a transaction requested of an account associated with the contactless card via the logic 112 executing on the client device 104. FIGS. 2A-2B depict exemplary interfaces that may be presented on the client device 104 in response to the logic.

FIG. 2A depicts an initial interface 200 for an application associated with the card (e.g., an application provided by the card provider), which may be displayed on the client device 104 when the client device 104 receives an instruction from the server 116 to reissue the card or otherwise reprovision or alter the information stored on the card. The interface 200 includes a message area 202 that displays information about the reissuance of the card information. This message area 202 may explain, for example, that the user's card has been reissued, why the reissue has occurred, and the next steps required for the user to change the card's information.

The interface 200 may further include an interactable element 204. In order to change the information stored on the card, the user may optionally first be required to select the interactable element 204 in order to verify the user's desire to reissue the card number (so that the user does not accidentally overwrite the card information by placing the card in proximity with the NFC reader).

Upon selecting the interactable element, the user can rewrite the PAN or other information stored on the card 130 by bringing the contact pad 138 of the card's chip in proximity to the device 104's NFC reader, as shown in FIG. 2B. When the card is brought into proximity with the NFC reader and the applets on the card confirm that the card's PAN has been successfully changed, a confirmation message 206 may be displayed indicating that the card's information has been successfully rewritten.

As an alternative to the procedure shown in FIGS. 2A-2B, the user may be prompted (in the interface 200) to tap their card on the client device's NFC reader in a predetermined pattern. The authentication and encryption applet may register the predetermined pattern Although FIGS. 2A-2B depict the card 130 being rewritten when brought into proximity with a mobile client device 104, it is also contemplated that the card could be rewritten by an automated teller machine, point of sale terminal, or any other device having a suitable transmitter (e.g., an NFC transmitter) for communicating with the contact pad 138.

As shown in FIG. 2B, when a new PAN is written to the chip on the contactless card, the new card number may not match the number printed or embossed on the card, or the information stored on the card's magnetic stripe. In this case, it may still be desirable to have a new physical card created and sent to the user so that the card's several payment options can all be used. Nonetheless, the contactless payment functionality of the card can still be used with the information stored on the chip while the card is being sent to the user. If the card includes an e-ink display, as noted above, the e-ink display may be updated at the time the PAN is rewritten in order to reflect the new card number. In this case, it may not be necessary to reissue the physical card, especially if the card does not include a magnetic stripe or if the user primarily uses the card to make contactless payments.

Figure 2C:
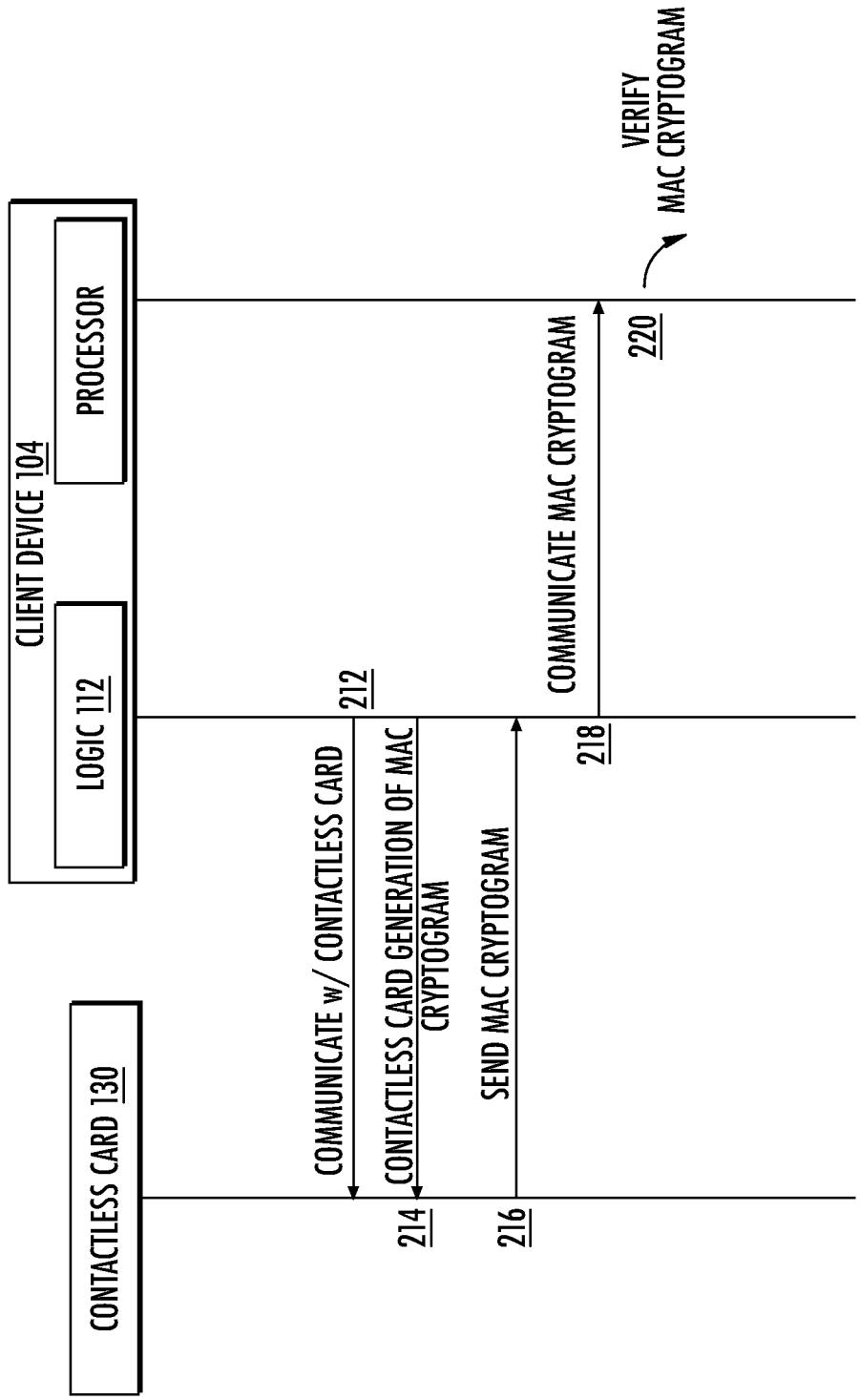
FIG. 2C depicts an example of data exchange between a contactless card and a client device.

FIG. 2C is a timing diagram illustrating an example sequence for providing authenticated access according to one or more embodiments of the present disclosure. A system may include a contactless card 130 and a client device 104, which may include an application (which may include the logic 112) and a processor.

At 202, the application communicates with the contactless card 130 (e.g., after being brought near the contactless card 130). Communication between the application and the contactless card 130 may involve the contactless card 130 being sufficiently close to a card reader (not shown) of the client device 104 to enable NFC data transfer between the application and the contactless card 130.

At step 204, after communication has been established between client device 104 and contactless card 130, the contactless card 130 generates a message authentication code (MAC) cryptogram. In some examples, this may occur when the contactless card 130 is read by an application hosting the logic 112. In particular, this may occur upon a read, such as an NFC read, of a near field data exchange (NDEF) tag, which may be created in accordance with the NFC Data Exchange Format. For example, a reader, such as the logic 112, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, a counter value maintained by the contactless card 130 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string).

In some examples, the logic 112 may be configured to transmit a request to the contactless card 130, the request comprising an instruction to generate a MAC cryptogram.

At step 206, the contactless card 130 sends the MAC cryptogram to the logic 112. In some examples, the transmission of the MAC cryptogram occurs via NFC, however, the present disclosure is not limited thereto. In other examples, this communication may occur via Bluetooth, Wi-Fi, or other means of wireless data communication.

At step 208, the logic 112 communicates the MAC cryptogram to the processor.

At step 210, the processor verifies the MAC cryptogram pursuant to an instruction from the logic 112. For example, the MAC cryptogram may be verified, as explained below.

In some examples, verifying the MAC cryptogram may be performed by a device other than client device 104, such as a server 116 in data communication with the client device 104. For example, the processor may output the MAC cryptogram for transmission to the server 116, which may verify the MAC cryptogram.

In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

Figure 2D:
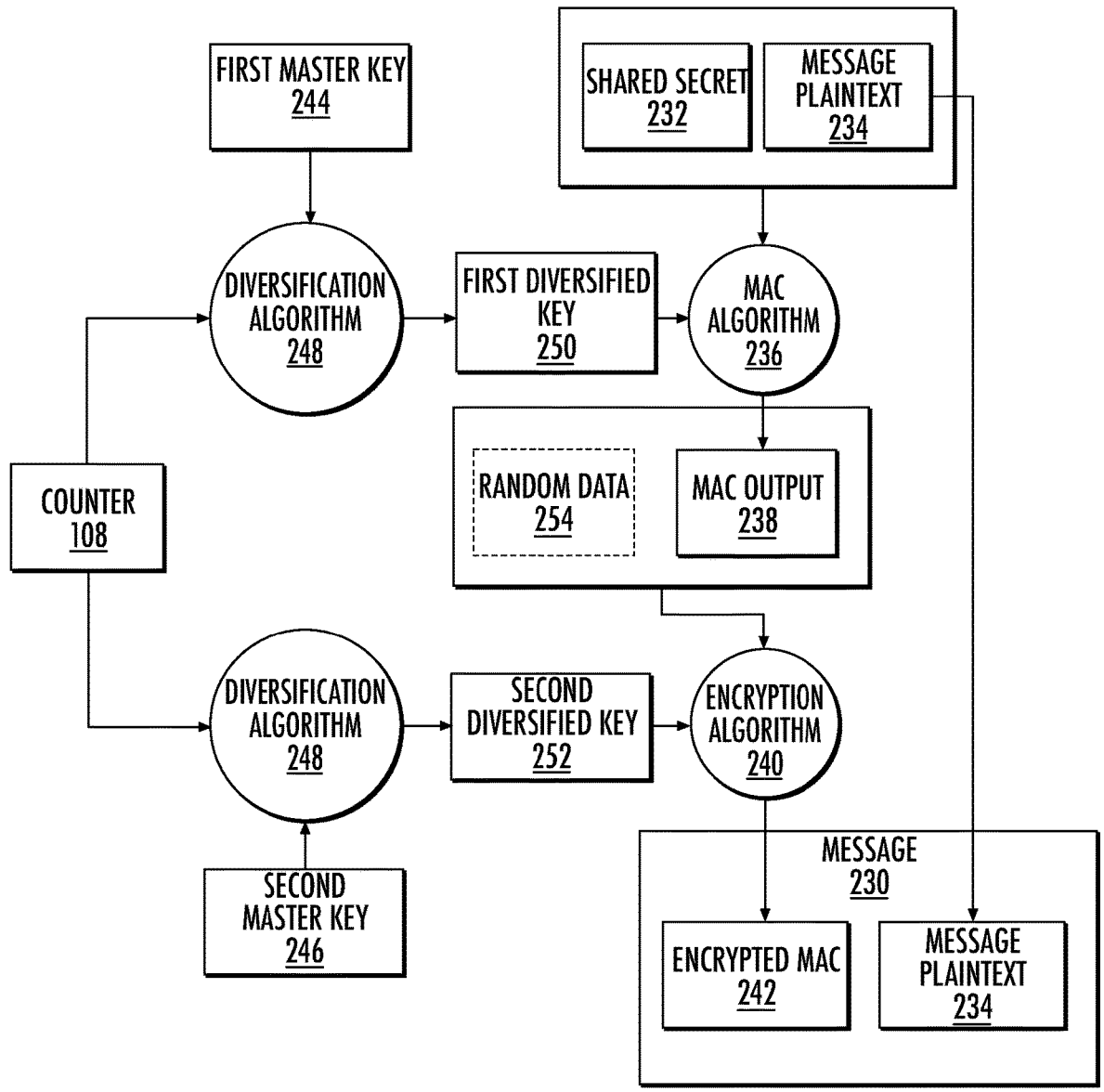
FIG. 2D depicts an exemplary data structure suitable for use with exemplary embodiments.

FIG. 2D depicts an exemplary technique for generating a protected message 230 in accordance with exemplary embodiments.

The message 230 may be configured to deliver information or content from a sender to a recipient. This information or content may be represented by message plaintext 234 (although the content may optionally be encrypted).

The message plaintext 234 may be combined with a shared secret 232. The shared secret 232 may be a random number known to both the sender and the recipient. For instance, if the message plaintext 234 relates to an authentication action for a contactless card as described above, the process of setting up or initializing the card may involve sharing a random number between the chip on the card and the transaction validation server. In one embodiment, the random number may be a 32-bit random number. Alternatively or in addition, a communication session may be set up by the sender and recipient; the process of setting up the communication session may involve sharing a random number between the sender and recipient, and the random number may be used as the shared secret 232.

The message plaintext 234 and the shared secret 232 may be combined in various ways. In one embodiment, the message plaintext 234 may be encoded in a format so that it can be multiplied by the shared secret 232. The resulting product may then be applied to the MAC algorithm.

When the recipient (e.g. a receiving server) retrieves the combined MAC data, the recipient may consult its version of the shared secret 232 and may reverse the process used to combine the MAC data with the shared secret (e.g., dividing the combined MAC data and the shared secret 232 to retrieve the original MAC data).

One of ordinary skill in the art will recognize that other techniques exist for combining two different instances of data, any of which may be suitable for use with exemplary embodiments.

After the message plaintext 234 and the shared secret 232 are combined, they may be provided to a MAC algorithm 236. The MAC algorithm 236 may be any suitable MAC algorithm, such as the data authentication algorithm (DAA), cipher block chaining message authentication codes (CBC-MAC), Galois message authentication code (GMAC), and hashed message authentication code (HMAC), among many others.

The MAC algorithm 236 may operate using a key. In exemplary embodiments, this key may be a first diversified key 250 created using a diversification algorithm 248. The diversification algorithm may operate on the counter 108 received from the contactless card and a first master key 244 stored on the contactless card (described in more detail below) to generate the first diversified key 250. Using the first diversified key 250 and the combined shared secret/plaintext, the MAC algorithm 236 may generate MAC output 238.

The MAC output 238 may optionally be encrypted by an encryption algorithm 240 to generate an encrypted MAC 242. The encryption algorithm 240 may be any suitable encryption algorithm, such as data encryption standard (DES), TripleDES (3DES), advanced encryption standard (AES), and RSA, among many others.

In some embodiments, the MAC output 238 may be truncated and/or combined with random data 254. For instance, in one embodiment, the beginning of the MAC output 238 may be discarded, so that (e.g.) only the last 8 bytes are preserved. The remaining portion of the MAC output 238 may be combined with 8 bytes of randomly generated data 254. When the recipient receives the message 300, the recipient may decrypt the encrypted MAC 242 and discard the random data. The recipient may calculate its own version of the MAC, as described below, and may compare the last 8 bytes of the recipient-generated MAC to the data remaining from the encrypted MAC 242 received as part of the message 230.

The encryption algorithm 240 may operate using a key. In exemplary embodiments, this key may be a second diversified key 252 created using the diversification algorithm 248. The diversification algorithm may operate on the counter 108 received from the contactless card and a second master key 246 stored on the contactless card (described in more detail below) to generate the second diversified key 252. Using the second diversified key 252 and the MAC output 238, the encryption algorithm 240 may generate an encrypted MAC 232, which may be included in a header of the message 230.

The encrypted MAC 232 may be transmitted along with the message plaintext 234. The counter value 108 may optionally be transmitted as part of the message plaintext 234, and may be consulted by the recipient (e.g., the server) in authenticating the message. The shared secret 232 is not directly sent as part of the message.

Figure 3:
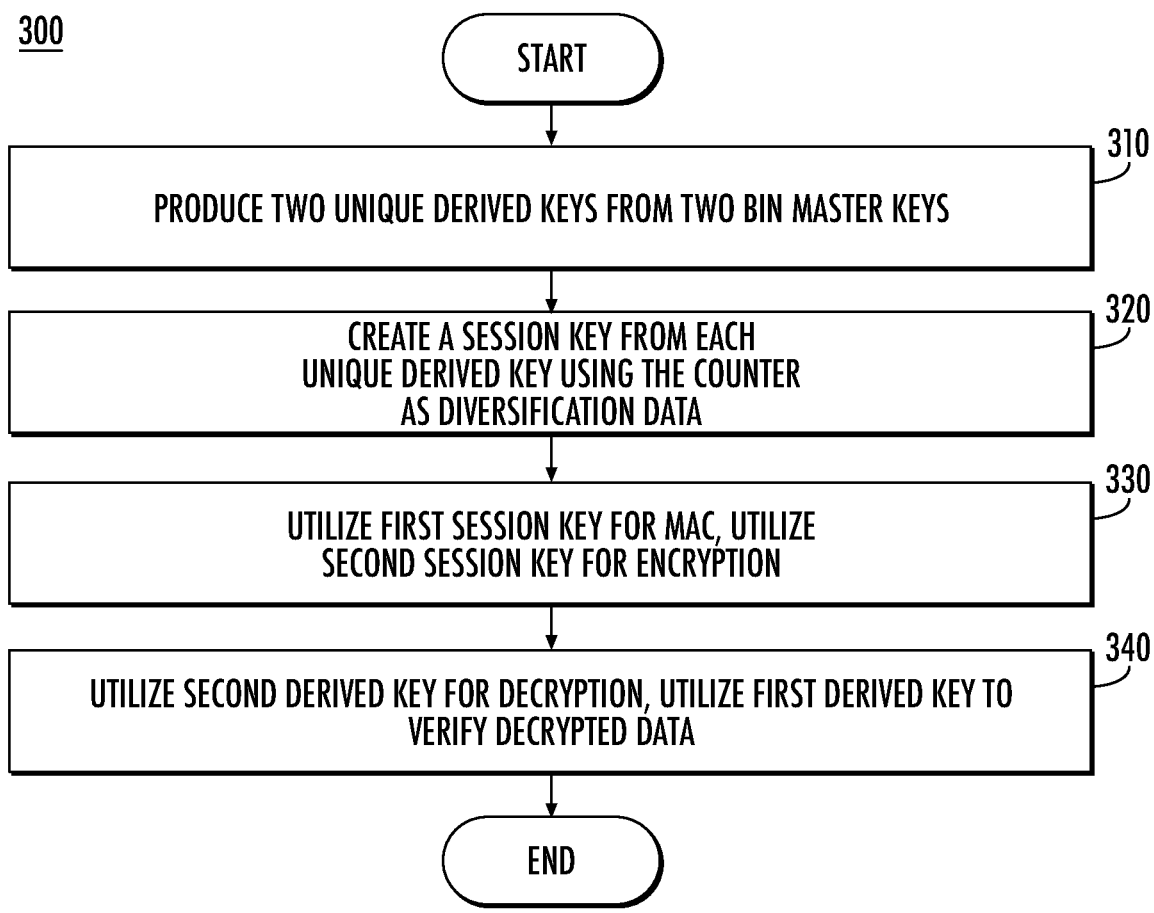
FIG. 3 is a flowchart illustrating key operations according to an example embodiment.

FIG. 3 is a flowchart illustrating key operations 300 according to an example embodiment. As illustrated in FIG. 3, at block 310, two bank identifier number (BIN) level master keys may be used in conjunction with the account identifier and card sequence number to produce two unique derived keys (UDKs) per card. In some examples, a bank identifier number may comprise one number or a combination of one or more numbers, such as an account number or an unpredictable number provided by one or more servers, may be used for session key generation and/or diversification. The UDKs (AUTKEY and ENCKEY) may be stored on the card during the personalization process.

At block 320, the counter may be used as the diversification data, since it changes with each use and provides a different session key each time, as opposed to the master key derivation in which one unique set of keys per card is produced. In some examples, it is preferable to use the 4-byte method for both operations. Accordingly, at block 320, two session keys may be created for each transaction from the UDKs, i.e., one session key from AUTKEY and one session key from ENCKEY. In the card, for the MAC key (i.e., the session key created from AUTKEY), the low order of two bytes of the OTP counter may be used for diversification. For the ENC key (i.e., the session key created from ENCKEY), the full length of the OTP counter may be used for the ENC key.

At block 330, the MAC key may be used for preparing the MAC cryptogram, and the ENC key may be used to encrypt the cryptogram. For example, the MAC session key may be used to prepare the cryptogram, and the result may be encrypted with the ENC key before it is transmitted to the one or more servers.

At block 340, verification and processing of the MAC is simplified because 2-byte diversification is directly supported in the MAC authentication functions of payment HSMs. Decryption of the cryptogram is performed prior to verification of the MAC. The session keys are independently derived at the one or more servers, resulting in a first session key (the ENC session key) and a second session key (the MAC session key). The second derived key (i.e., the ENC session key) may be used to decrypt the data, and the first derived key (i.e., the MAC session key) may be used to verify the decrypted data.

For the contactless card, a different unique identifier is derived which may be related to the application primary account number (PAN) and PAN sequence number, which is encoded in the card. The key diversification may be configured to receive the identifier as input with the master key such that one or more keys may be created for each contactless card. In some examples, these diversified keys may comprise a first key and a second key. The first key may include an authentication master key (Card Cryptogram Generation/Authentication Key—Card-Key-Auth), and may be further diversified to create a MAC session key used when generating and verifying a MAC cryptogram. The second key may comprise an encryption master key (Card Data Encryption Key—Card-Key-DEK), and may be further diversified to create an ENC session key used when encrypting and decrypting enciphered data. In some examples, the first and the second keys may be created by diversifying the issuer master keys by combining them with the card's unique ID number (pUID) and the PAN sequence number (PSN) of a payment applet. The pUID may comprise a 16-digit numerical value. As explained above, pUID may comprise a 16 digit BCD encoded number. In some examples, pUID may comprise a 14-digit numerical value.

In some examples, since the EMV session key derivation method may wrap at $2^{16}$ uses, the counter such as the full 32-bit counter may be added to the initialization arrays of the diversification method.

In other examples, such as credit cards, a number, such as an account number or an unpredictable number provided by one or more servers, may be used for session key generation and/or diversification.

Figure 4:
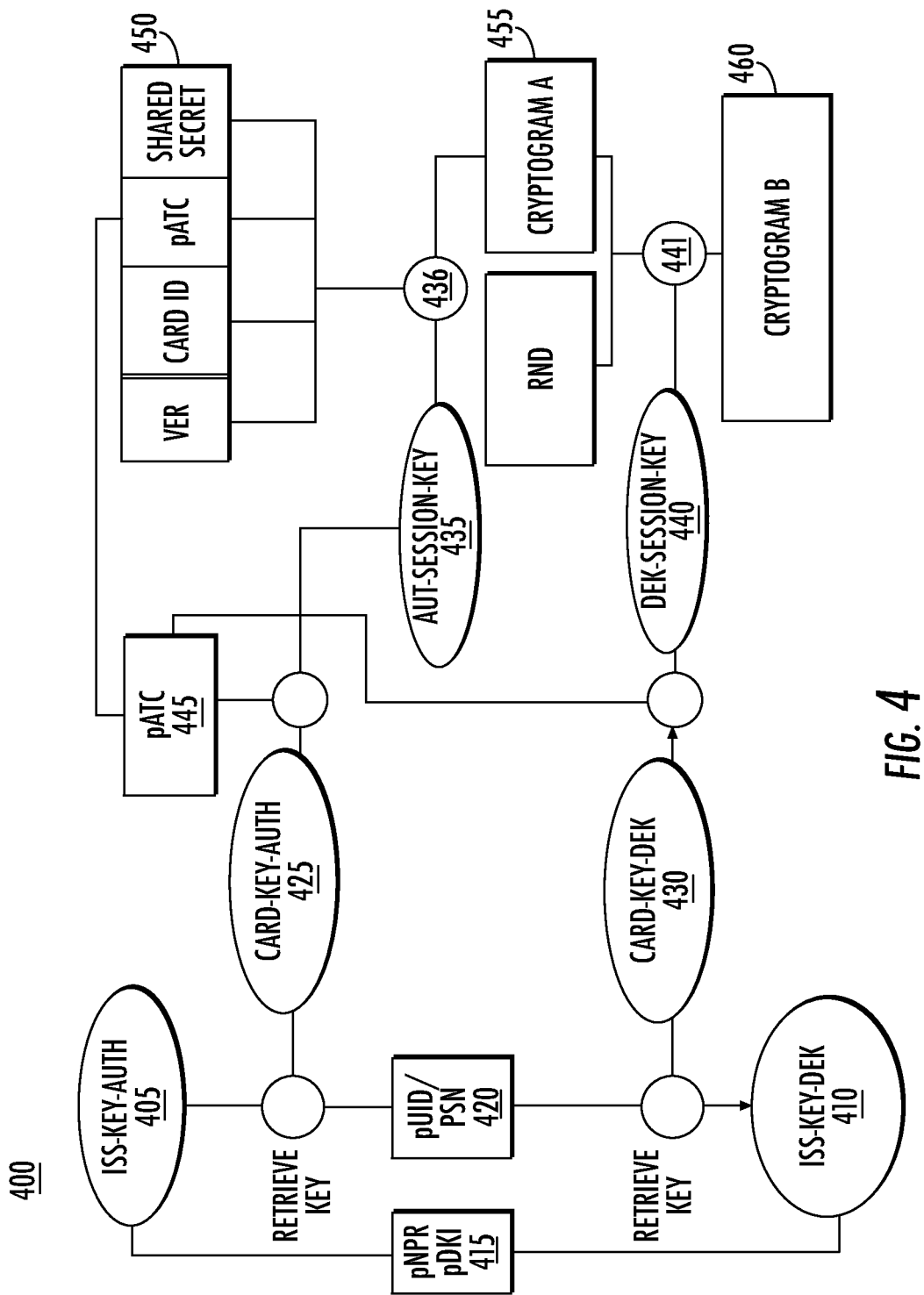
FIG. 4 is a diagram of a key system according to an example embodiment.

FIG. 4 illustrates a diagram of a system 400 configured to implement one or more embodiments of the present disclosure. As explained below, during the contactless card creation process, two cryptographic keys may be assigned uniquely for each card. The cryptographic keys may comprise symmetric keys which may be used in both encryption and decryption of data. Triple DES (3DES) algorithm may be used by EMV and it is implemented by hardware in the contactless card. By using a key diversification process, one or more keys may be derived from a master key based upon uniquely identifiable information for each entity that requires a key.

Regarding master key management, two issuer master keys 405, 410 may be required for each part of the portfolio on which the one or more applets is issued. For example, the first master key 405 may comprise an Issuer Cryptogram Generation/Authentication Key (Iss-Key-Auth) and the second master key 410 may comprise an Issuer Data Encryption Key (Iss-Key-DEK). As further explained herein, two issuer master keys 405, 410 are diversified into card master keys 425, 430, which are unique for each card. In some examples, a network profile record ID (pNPR) 415 and derivation key index (pDKI) 420, as back office data, may be used to identify which Issuer Master Keys 405, 410 to use in the cryptographic processes for authentication. The system performing the authentication may be configured to retrieve values of pNPR 415 and pDKI 420 for a contactless card at the time of authentication.

In some examples, to increase the security of the solution, a session key may be derived (such as a unique key per session) but rather than using the master key, the unique card-derived keys and the counter may be used as diversification data, as explained above. For example, each time the card is used in operation, a different key may be used for creating the message authentication code (MAC) and for performing the encryption. Regarding session key generation, the keys used to generate the cryptogram and encipher the data in the one or more applets may comprise session keys based on the card unique keys (Card-Key-Auth 425 and Card-Key-Dek 430). The session keys (Aut-Session-Key 435 and DEK-Session-Key 440) may be generated by the one or more applets and derived by using the application transaction counter (pATC) 445 with one or more algorithms. To fit data into the one or more algorithms, only the 2 low order bytes of the 4-byte pATC 445 is used. In some examples, the four byte session key derivation method may comprise: F1:=PATC(lower 2 bytes)||'F0'||'00'||PATC (four bytes) F1:=PATC(lower 2 bytes)||'0F'||'00'||PATC (four bytes) SK:={(ALG (MK) [F1])||ALG (MK) [F2]}, where ALG may include 3DES ECB and MK may include the card unique derived master key.

As described herein, one or more MAC session keys may be derived using the lower two bytes of pATC 445 counter. At each tap of the contactless card, pATC 445 is configured to be updated, and the card master keys Card-Key-AUTH 425 and Card-Key-DEK 430 are further diversified into the session keys Aut-Session-Key 435 and DEK-Session-KEY 440. pATC 445 may be initialized to zero at personalization or applet initialization time. In some examples, the pATC counter 445 may be initialized at or before personalization, and may be configured to increment by one at each NDEF read.

Further, the update for each card may be unique, and assigned either by personalization, or algorithmically assigned by pUID or other identifying information. For example, odd numbered cards may increment or decrement by 2 and even numbered cards may increment or decrement by 5. In some examples, the update may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

In some examples, only the authentication data and an 8-byte random number followed by MAC of the authentication data may be included. In some examples, the random number may precede cryptogram A and may be one block long. In other examples, there may be no restriction on the length of the random number. In further examples, the total data (i.e., the random number plus the cryptogram) may be a multiple of the block size. In these examples, an additional 8-byte block may be added to match the block produced by the MAC algorithm. As another example, if the algorithms employed used 16-byte blocks, even multiples of that block size may be used, or the output may be automatically, or manually, padded to a multiple of that block size.

The MAC may be performed by a function key (AUT-Session-Key) 435. The data specified in cryptogram may be processed with javacard.signature method: ALG_DES_MAC8_ISO9797_1_M2_ALG3 to correlate to EMV ARQC verification methods. The key used for this computation may comprise a session key AUT-Session-Key 435, as explained above. As explained above, the low order two bytes of the counter may be used to diversify for the one or more MAC session keys. As explained below, AUT-Session-Key 435 may be used to MAC data 450, and the resulting data or cryptogram A 455 and random number RND may be encrypted using DEK-Session-Key 440 to create cryptogram B or output 460 sent in the message.

In some examples, one or more HSM commands may be processed for decrypting such that the final 16 (binary, 32 hex) bytes may comprise a 3DES symmetric encrypting using CBC mode with a zero IV of the random number followed by MAC authentication data. The key used for this encryption may comprise a session key DEK-Session-Key 440 derived from the Card-Key-DEK 430. In this case, the ATC value for the session key derivation is the least significant byte of the counter pATC 445.

The format below represents a binary version example embodiment. In some examples, the first byte may be set to ASCII 'A'.

| Message Format | | | | |
|---|---|---|---|---|
| 1 | 2 | 4 | 8 | 8 |
| 0x43 (Message Type 'A') Cryptogram A (MAC) Mac of | Version 8 bytes | pATC | RND | Cryptogram A (MAC) |
| 2 Version | 8 pUID | 4 pATC | 4 Shared Secret | 18 bytes input data |

| Message Format | | | | |
|---|---|---|---|---|
| 1 | 2 | 4 | 16 | |
| 0x43 (Message Type 'A') Cryptogram A (MAC) MAC of | Version 8 bytes | pATC | Cryptogram B | |
| 2 Version Cryptogram B Sym Encryption of 8 RND | 8 pUID 16 8 Cryptogram A | 4 pATC | 4 Shared Secret | 18 bytes input data |

The authentication message may be delivered as the content of a text NDEF record in hexadecimal ASCII format.

Another exemplary format is shown below. In this example, the tag may be encoded in hexadecimal format.

| Message Format | | | | |
|---|---|---|---|---|
| 2 | 8 | 4 | 8 | 8 |

-continued

| Version 8 bytes | pUID | pATC | RND | Cryptogram A (MAC) |
|---|---|---|---|---|
| 8 pUID | 8 pUID | 4 pATC | 4 Shared Secret | 18 bytes input data |

Message Format

| 2 Version 8 bytes | 8 pUID | 4 pATC | | 16 Cryptogram B | |
|---|---|---|---|---|---|
| 8 pUID Cryptogram B Sym Encryption of 8 RND | pUID 16 Cryptogram A | pATC | 4 Shared Secret | | 18 bytes input data |

The UID field of the received message may be extracted to derive, from master keys Iss-Key-AUTH 405 and Iss-Key-DEK 410, the card master keys (Card-Key-Auth 425 and Card-Key-DEK 430) for that particular card. Using the card master keys (Card-Key-Auth 425 and Card-Key-DEK 430), the counter (pATC) field of the received message may be used to derive the session keys (Aut-Session-Key 435 and DEK-Session-Key 440) for that particular card. Cryptogram B 460 may be decrypted using the DEK-Session-KEY, which yields cryptogram A 455 and RND, and RND may be discarded. The UID field may be used to look up the shared secret of the contactless card which, along with the Ver, UID, and pATC fields of the message, may be processed through the cryptographic MAC using the re-created Aut-Session-Key to create a MAC output, such as MAC'. If MAC' is the same as cryptogram A 955, then this indicates that the message decryption and MAC checking have all passed. Then the pATC may be read to determine if it is valid.

During an authentication session, one or more cryptograms may be generated by the one or more applications. For example, the one or more cryptograms may be generated as a 3DES MAC using ISO 9797-1 Algorithm 3 with Method 2 padding via one or more session keys, such as Aut-Session-Key 435. The input data 450 may take the following form: Version (2), pUID (8), pATC (4), Shared Secret (4). In some examples, the numbers in the brackets may comprise length in bytes. In some examples, the shared secret may be generated by one or more random number generators which may be configured to ensure, through one or more secure processes, that the random number is unpredictable. In some examples, the shared secret may comprise a random 4-byte binary number injected into the card at personalization time that is known by the authentication service. During an authentication session, the shared secret may not be provided from the one or more applets to the mobile application. Method 2 padding may include adding a mandatory 0x'80' byte to the end of input data and 0x'00' bytes that may be added to the end of the resulting data up to the 8-byte boundary. The resulting cryptogram may comprise 8 bytes in length.

In some examples, one benefit of encrypting an unshared random number as the first block with the MAC cryptogram, is that it acts as an initialization vector while using CBC (Block chaining) mode of the symmetric encryption algorithm. This allows the "scrambling" from block to block without having to pre-establish either a fixed or dynamic IV.

By including the application transaction counter (pATC) as part of the data included in the MAC cryptogram, the authentication service may be configured to determine if the value conveyed in the clear data has been tampered with. Moreover, by including the version in the one or more cryptograms, it is difficult for an attacker to purposefully misrepresent the application version in an attempt to downgrade the strength of the cryptographic solution. In some examples, the pATC may start at zero and be updated by 1 each time the one or more applications generates authentication data. The authentication service may be configured to track the pATCs used during authentication sessions. In some examples, when the authentication data uses a pATC equal to or lower than the previous value received by the authentication service, this may be interpreted as an attempt to replay an old message, and the authenticated may be rejected. In some examples, where the pATC is greater than the previous value received, this may be evaluated to determine if it is within an acceptable range or threshold, and if it exceeds or is outside the range or threshold, verification may be deemed to have failed or be unreliable. In the MAC operation 436, data 450 is processed through the MAC using Aut-Session-Key 435 to produce MAC output (cryptogram A) 455, which is encrypted.

In order to provide additional protection against brute force attacks exposing the keys on the card, it is desirable that the MAC cryptogram 455 be enciphered. In some examples, data or cryptogram A 455 to be included in the ciphertext may comprise: Random number (8), cryptogram (8). In some examples, the numbers in the brackets may comprise length in bytes. In some examples, the random number may be generated by one or more random number generators which may be configured to ensure, through one or more secure processes, that the random number is unpredictable. The key used to encipher this data may comprise a session key. For example, the session key may comprise DEK-Session-Key 440. In the encryption operation 441, data or cryptogram A 455 and RND are processed using DEK-Session-Key 440 to produce encrypted data, cryptogram B 460. The data 455 may be enciphered using 3DES in cipher block chaining mode to ensure that an attacker must run any attacks over all of the ciphertext. As a non-limiting example, other algorithms, such as Advanced Encryption Standard (AES), may be used. In some examples, an initialization vector of 0x'0000000000000000' may be used. Any attacker seeking to brute force the key used for enciphering this data will be unable to determine when the correct key has been used, as correctly decrypted data will be indistinguishable from incorrectly decrypted data due to its random appearance.

In order for the authentication service to validate the one or more cryptograms provided by the one or more applets, the following data must be conveyed from the one or more applets to the mobile device in the clear during an authentication session: version number to determine the cryptographic approach used and message format for validation of the cryptogram, which enables the approach to change in the future; pUID to retrieve cryptographic assets, and derive the card keys; and pATC to derive the session key used for the cryptogram.

Figure 5:
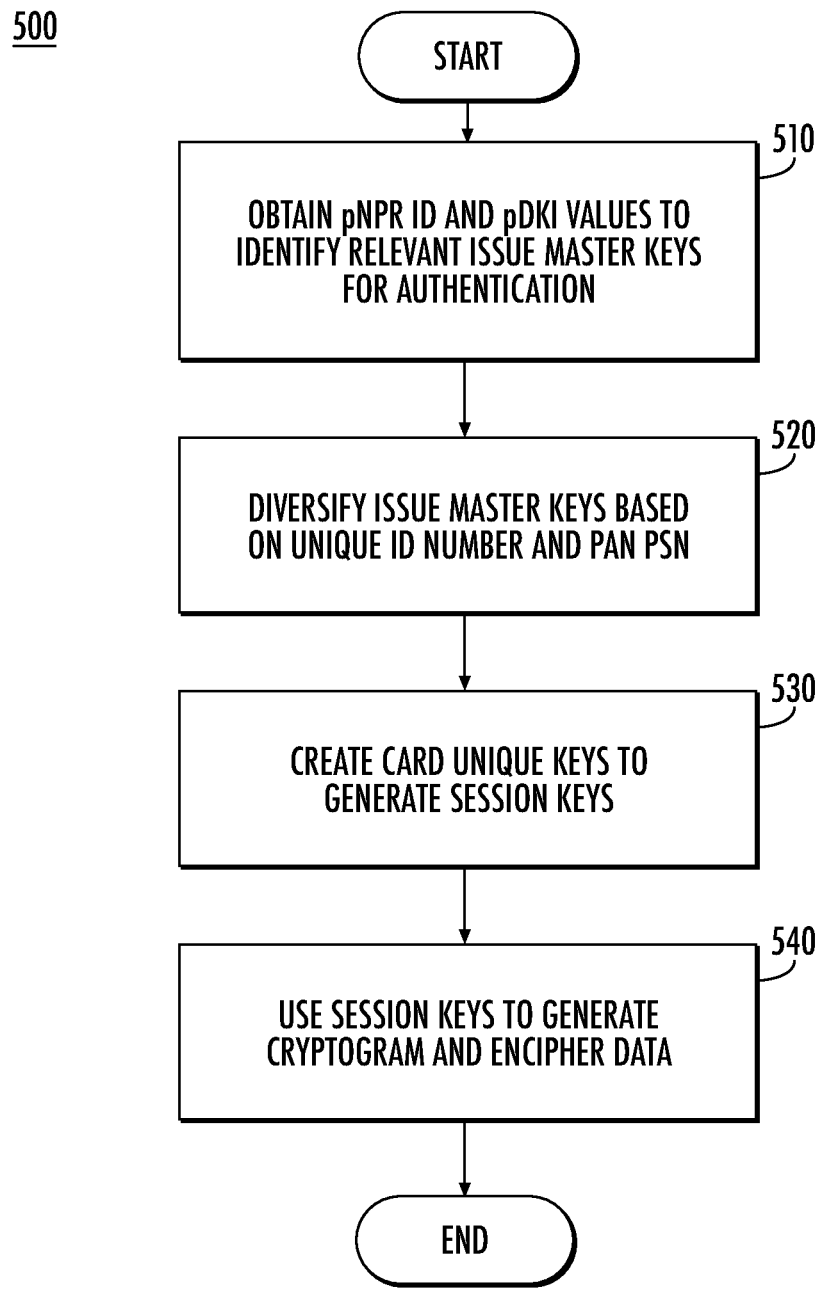
FIG. 5 is a flowchart of a method of generating a cryptogram according to an example embodiment.

FIG. 5 illustrates a method 500 for generating a cryptogram. For example, at block 510, a network profile record ID (pNPR) and derivation key index (pDKI) may be used to identify which Issuer Master Keys to use in the cryptographic processes for authentication. In some examples, the method may include performing the authentication to retrieve values of pNPR and pDKI for a contactless card at the time of authentication.

At block 520, Issuer Master Keys may be diversified by combining them with the card's unique ID number (pUID) and the PAN sequence number (PSN) of one or more applets, for example, a payment applet.

At block 530, Card-Key-Auth and Card-Key-DEK (unique card keys) may be created by diversifying the Issuer Master Keys to generate session keys which may be used to generate a MAC cryptogram.

At block 540, the keys used to generate the cryptogram and encipher the data in the one or more applets may comprise the session keys of block 530 based on the card unique keys (Card-Key-Auth and Card-Key-DEK). In some examples, these session keys may be generated by the one or more applets and derived by using pATC, resulting in session keys Aut-Session-Key and DEK-Session-Key.

Figure 6A:
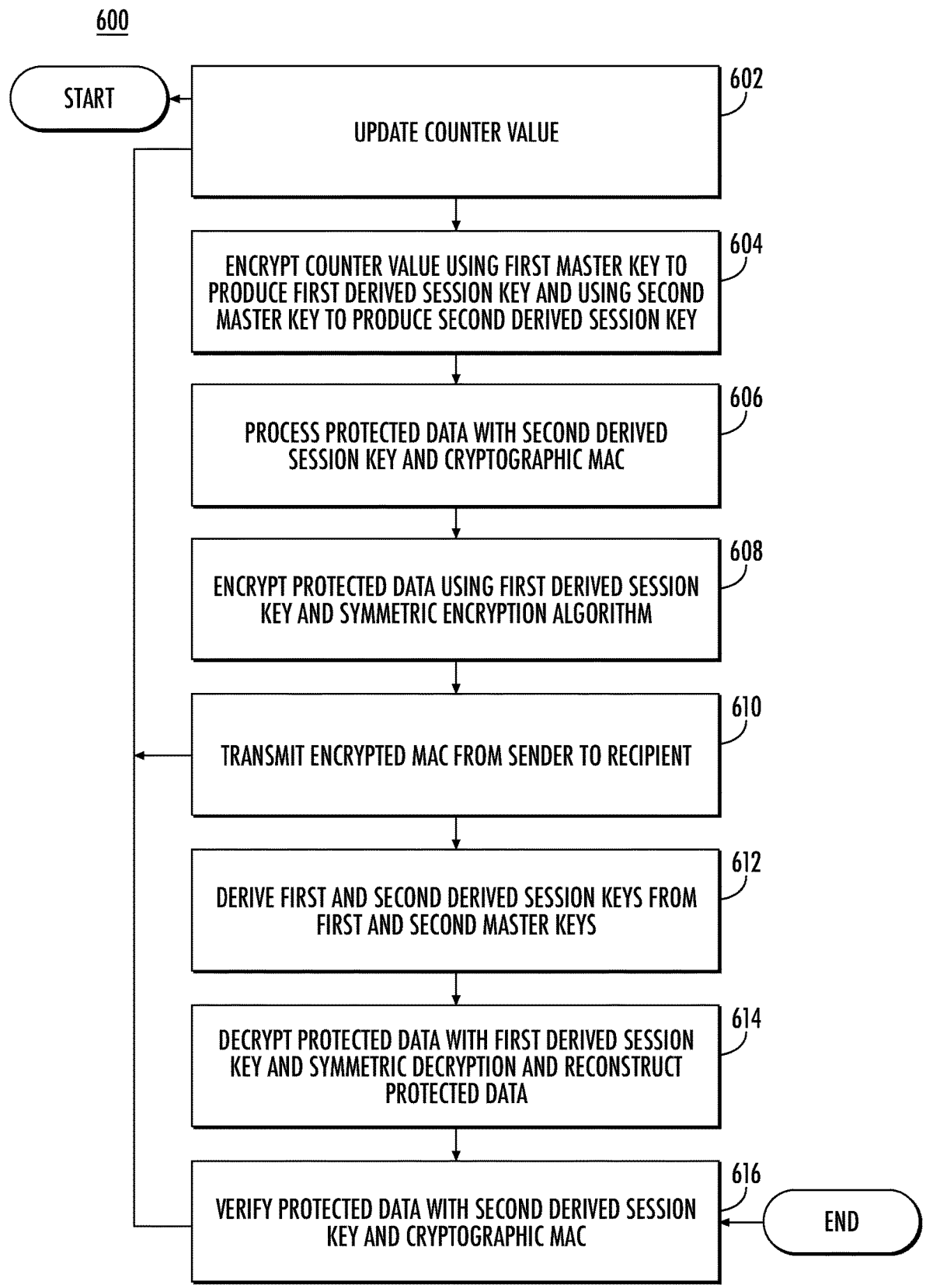
FIG. 6A is a flowchart illustrating a process of key diversification according to an example embodiment.

FIG. 6 depicts an exemplary process 600 illustrating key diversification according to one example. Initially, a sender and the recipient may be provisioned with two different master keys. For example, a first master key may comprise the data encryption master key, and a second master key may comprise the data integrity master key. The sender has a counter value, which may be updated at block 602, and other data, such as data to be protected, which it may securely share with the recipient.

At block 604, the counter value may be encrypted by the sender using the data encryption master key to produce the data encryption derived session key, and the counter value may also be encrypted by the sender using the data integrity master key to produce the data integrity derived session key. In some examples, a whole counter value or a portion of the counter value may be used during both encryptions.

In some examples, the counter value may not be encrypted. In these examples, the counter may be transmitted between the sender and the recipient in the clear, i.e., without encryption.

At block 606, the data to be protected is processed with a cryptographic MAC operation by the sender using the data integrity session key and a cryptographic MAC algorithm. The protected data, including plaintext and shared secret, may be used to produce a MAC using one of the session keys (AUT-Session-Key).

At block 608 the data to be protected may be encrypted by the sender using the data encryption derived session key in conjunction with a symmetric encryption algorithm. In some examples, the MAC is combined with an equal amount of random data, for example each 8 bytes long, and then encrypted using the second session key (DEK-Session-Key).

At block 610, the encrypted MAC is transmitted, from the sender to the recipient, with sufficient information to identify additional secret information (such as shared secret, master keys, etc.), for verification of the cryptogram.

At block 612, the recipient uses the received counter value to independently derive the two derived session keys from the two master keys as explained above.

At block 614, the data encryption derived session key is used in conjunction with the symmetric decryption operation to decrypt the protected data. Additional processing on the exchanged data will then occur. In some examples, after the MAC is extracted, it is desirable to reproduce and match the MAC. For example, when verifying the cryptogram, it may be decrypted using appropriately generated session keys. The protected data may be reconstructed for verification. A MAC operation may be performed using an appropriately generated session key to determine if it matches the decrypted MAC. As the MAC operation is an irreversible process, the only way to verify is to attempt to recreate it from source data.

At block 616, the data integrity derived session key is used in conjunction with the cryptographic MAC operation to verify that the protected data has not been modified.

Some examples of the methods described herein may advantageously confirm when a successful authentication is determined when the following conditions are met. First, the ability to verify the MAC shows that the derived session key was proper. The MAC may only be correct if the decryption was successful and yielded the proper MAC value. The successful decryption may show that the correctly derived encryption key was used to decrypt the encrypted MAC. Since the derived session keys are created using the master keys known only to the sender (e.g., the transmitting device) and recipient (e.g., the receiving device), it may be trusted that the contactless card which originally created the MAC and encrypted the MAC is indeed authentic. Moreover, the counter value used to derive the first and second session keys may be shown to be valid and may be used to perform authentication operations.

Thereafter, the two derived session keys may be discarded, and the next iteration of data exchange will update the counter value (returning to block 602) and a new set of session keys may be created (at block 604). In some examples, the combined random data may be discarded.

Figure 6B:
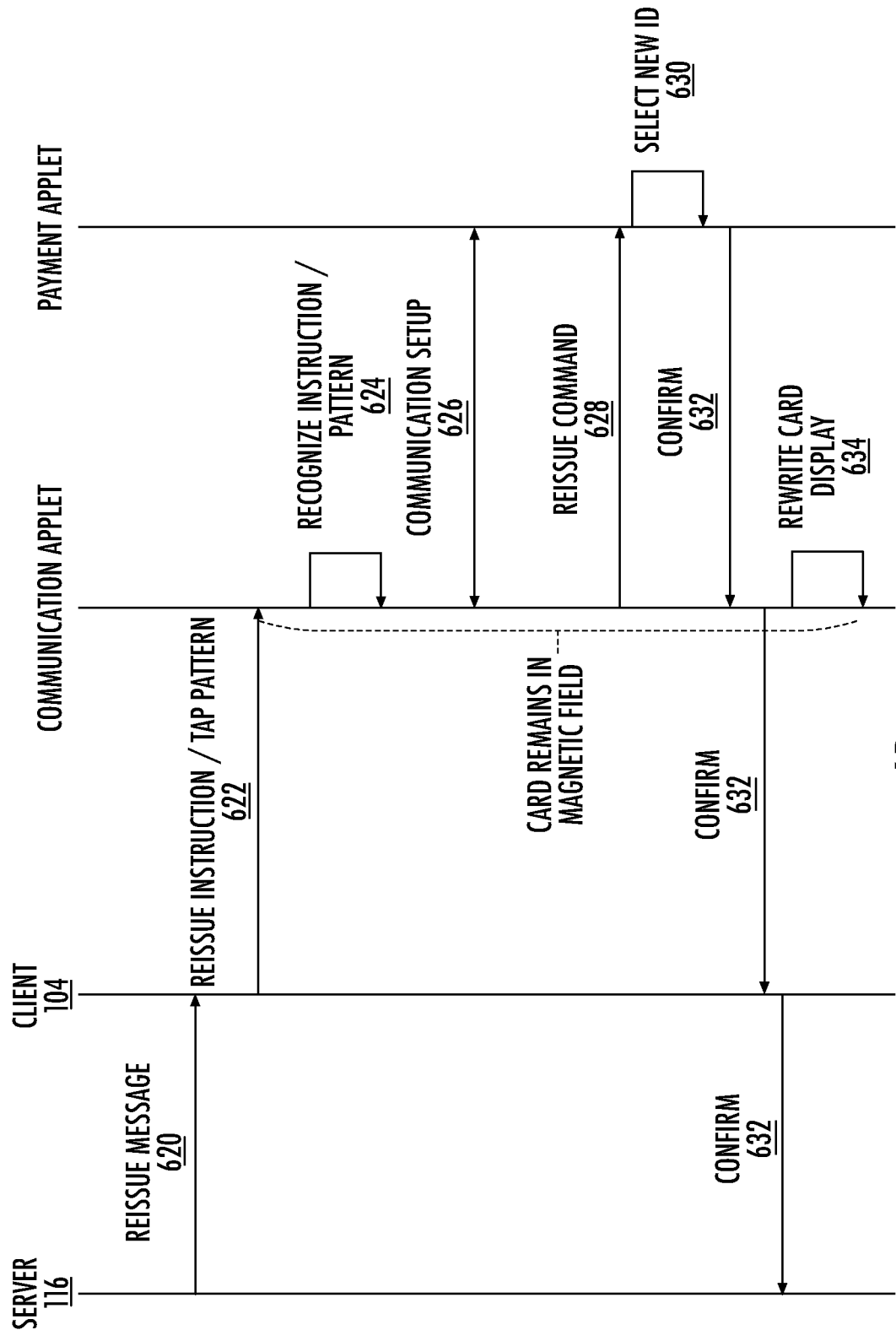
FIG. 6B is a data flow diagram showing an exchange of communications in an exemplary embodiment.
Figure 6C:
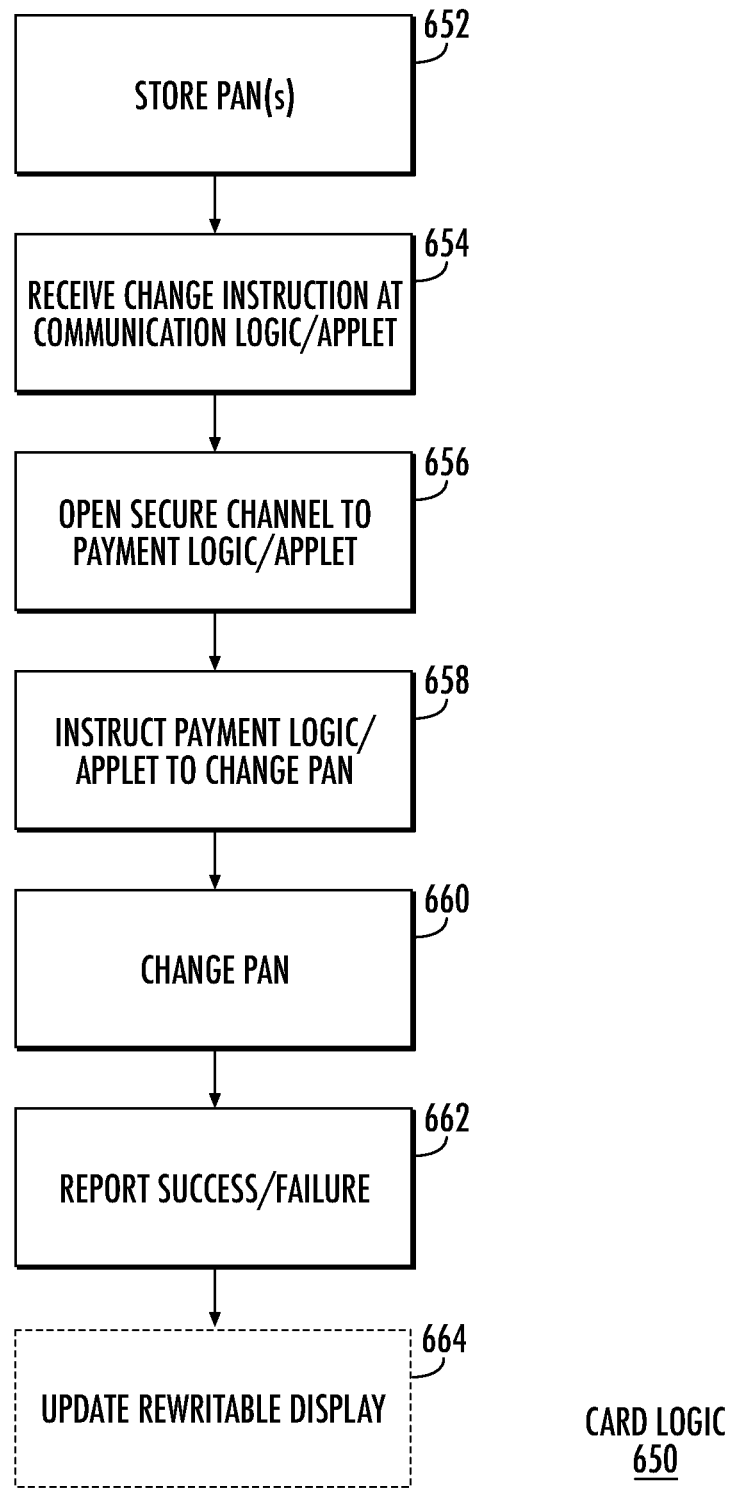
FIG. 6C is a flowchart depicting card-side logic for changing an identifier associated with a contactless card.

FIG. 6B depicts a timing diagram showing an exemplary exchange of messages according to an embodiment. FIG. 6C depicts an exemplary flow chart showing logic 650 performed by the applets, logic, or programs on the card 130, and is discussed in parallel with FIG. 6B.

Beginning at FIG. 6C, the payment/transaction applet may, at block 652, store one or more PANs for the card. The PANs may be written to the card when the card is initially issued. In some embodiments, only one PAN is issued to the card, and the payment/transaction applet maintains the PAN or accesses it in a defined location in memory. The payment/transaction applet may be capable of writing or rewriting the PAN, and may do so when a new PAN is called for. In other embodiments, multiple PANs may be issued to the card, and may be stored in a list. One PAN (such as the first PAN in the list) may be designated as the active PAN to be used for payments and transactions. When a new PAN is needed, the old PAN may be deleted and the next PAN in the list may become the active PAN; alternatively or in addition, a different PAN in the list may be designated as the current PAN.

Turning to FIG. 6B, the reissue process may begin when the server 116 transmits a reissue message 620 to a client 104. The reissue message may be a message indicating that a particular card belonging to an account holder associated with the client device 104 should have its identifier/PAN reissued, altered, or otherwise changed. The account holder may be associated to the client device 104 by virtue of installing an application on the client device 104 belonging to the card issuer (which may also maintain the server 116).

For example, the user may install an application that allows the user to review their outstanding balance, make payments, etc., and the user's particular cards may be associated with the application based on the account/card number(s) assigned to the user. The application may communicate with the server 116 and may register the device 104 with the server. The user may log into their account with the card provider through the application and thereby associate their account with the device 104.

The application may also communicate with the user's card 130, and thereby establish a communication link from the server 116 to the card 130. When the server 116 determines that the user's account number has been compromised (or that the card number needs to be reissued for another reason), the server 116 may contact the user's application on the device 104 to achieve this. The user's old number or identifier may be voided before, during, or after sending the reissue message 620.

Upon receiving the reissue message, the application on the client 104 may recognize that the PAN must be reissued. The application may be programmed with multiple techniques for communicating this information to the communication/authentication applet on the card in a reissue instruction or tap pattern 622.

One technique may involve issuing an NFC write command (or another suitable command using a different communication protocol) to the communication/authentication applet on the card 130. The NFC write command may identify that the card number or identifier is to be changed. This technique may be suitable for devices, such as those running the Android operating system, that are capable of issuing an NFC write command directly to the applets on the card.

Some operating systems, such as the iOS operating system, are not capable of issuing an NFC write command directly to these applets. Accordingly, the application may be programmed with logic configured to cause a display device to present instructions to the user requesting that the user tap their card 130 to the NFC reader on the device 104 in a predetermined pattern. This logic may have a counterpart on the communication/authentication applet, which is configured to recognize the predetermined pattern and interpret this pattern as an instruction to reissue the PAN or identification number.

At 624, the communication/authentication applet on the card recognizes the instruction or pattern 622 and initiates a card change process (block 654 of FIG. 6C).

First, the communication/authentication applet sets up a secure communication channel or secure form of data transmission between the communication/authentication applet and payment/transaction applet at 626 (block 656 of FIG. 6C). This communication channel may be built into the chip on the card 130 such that an express setup procedure is not required, or may be an ad hoc communication channel or data transmission form that is set up on an as-needed basis.

The communication/authentication applet may transmit a reissue command 628 to the payment/transaction applet over the secure communication channel (block 658 in FIG. 6C). In response, the payment/transaction applet may, at 630 (block 660 of FIG. 6C), select a new identifier or PAN (e.g., advancing to the next PAN in a list, generating an entirely new PAN from scratch, deriving a new PAN from the old PAN and/or other information stored on the card, etc.). In some cases, the process for selecting the new identifier or PAN may be coordinated with the server 116, as previously discussed.

The payment/transaction applet may determine if the change in the identifier or PAN was successful (e.g., a new PAN meeting certain predefined requirements has been generated). If there was a problem in the process, or if the new PAN could not be validated according to the requirements, the payment/transaction applet may report a failure to the communication/authentication applet (block 652 of FIG. 6C). The card's chip may optionally be de-authorized for performing transactions at this point.

If the updating of the PAN or identifier was successful, then the payment/transaction applet may confirm 632 the success to the communication/authentication applet, which may relay that confirmation back towards the server 116 (block 652 of FIG. 6C).

If the card includes a rewritable display such as an e-ink display, then at 634 the communication/authentication applet (or other suitable logic on the card) may cause the display to be rewritten with the new card identifier (see block 654 of FIG. 6C). Optionally, the card may remain in the magnetic field caused by the communication with the device 104 during this process, so that the energy from the communication can be used to update the display.

Example embodiments of systems and methods described herein may be configured to provide security factor authentication. The security factor authentication may comprise a plurality of processes. As part of the security factor authentication, a first process may comprise logging in and validating a user via one or more applications executing on a device. As a second process, the user may, responsive to successful login and validation of the first process via the one or more applications, engage in one or more behaviors associated with one or more contactless cards. In effect, the security factor authentication may include both securely proving identity of the user and engaging in one or more types of behaviors, including but not limited to one or more tap gestures, associated with the contactless card. In some examples, the one or more tap gestures may comprise a tap of the contactless card by the user to a device. In some examples, the device may comprise a mobile device, a kiosk, a terminal, a tablet, or any other device configured to process a received tap gesture.

In some examples, the contactless card may be tapped to a device, such as one or more computer kiosks or terminals, to verify identity so as to receive a transactional item responsive to a purchase, such as a coffee. By using the contactless card, a secure method of proving identity in a loyalty program may be established. Securely proving the identity, for example, to obtain a reward, coupon, offer, or the like or receipt of a benefit is established in a manner that is different than merely scanning a bar card. For example, an encrypted transaction may occur between the contactless card and the device, which may configured to process one or more tap gestures. As explained above, the one or more applications may be configured to validate identity of the user and then cause the user to act or respond to it, for example, via one or more tap gestures. In some examples, data for example, bonus points, loyalty points, reward points, healthcare information, etc., may be written back to the contactless card.

In some examples, the contactless card may be tapped to a device, such as a mobile device. As explained above, identity of the user may be verified by the one or more applications which would then grant the user a desired benefit based on verification of the identity.

In some examples, the contactless card may be activated by tapping to a device, such as a mobile device. For example, the contactless card may communicate with an application of the device via a card reader of the device through NFC communication. The communication, in which a tap of the card proximate the card reader of the device may allow the application of the device to read data associated with the contactless card and activate the card. In some examples, the activation may authorize the card to be used to perform other functions, e.g., purchases, access account or restricted information, or other functions. In some examples, the tap may activate or launch the application of the device and then initiate one or more actions or communications with one or more servers to activate the contactless card. If the application is not installed on the device, a tap of the contactless card proximate the card reader may initiate a download of the application, such as navigation to a download page of the application). Subsequent to installation, a tap of the contactless card may activate or launch the application, and then initiate, for example via the application or other back-end communication), activation of the contactless card. After activation, the contactless card may be used in various activities, including without limitation commercial transactions.

In some embodiments, a dedicated application may be configured to execute on a client device to perform the activation of the contactless card. In other embodiments, a webportal, a web-based app, an applet, and/or the like may perform the activation. Activation may be performed on the client device, or the client device may merely act as a go between for the contactless card and an external device (e.g., account server). According to some embodiments, in providing activation, the application may indicate, to the account server, the type of device performing the activation (e.g., personal computer, smartphone, tablet, or point-of-sale (POS) device). Further, the application may output, for transmission, different and/or additional data to the account server depending on the type of device involved. For example, such data may comprise information associated with a merchant, such as merchant type, merchant ID, and information associated with the device type itself, such as POS data and POS ID.

In some embodiments, the example authentication communication protocol may mimic an offline dynamic data authentication protocol of the EMV standard that is commonly performed between a transaction card and a point-of-sale device, with some modifications. For example, because the example authentication protocol is not used to complete a payment transaction with a card issuer/payment processor per se, some data values are not needed, and authentication may be performed without involving real-time online connectivity to the card issuer/payment processor. As is known in the art, point of sale (POS) systems submit transactions including a transaction value to a card issuer. Whether the issuer approves or denies the transaction may be based on if the card issuer recognizes the transaction value. Meanwhile, in certain embodiments of the present disclosure, transactions originating from a mobile device lack the transaction value associated with the POS systems. Therefore, in some embodiments, a dummy transaction value (i.e., a value recognizable to the card issuer and sufficient to allow activation to occur) may be passed as part of the example authentication communication protocol. POS based transactions may also decline transactions based on the number of transaction attempts (e.g., transaction counter). A number of attempts beyond a buffer value may result in a soft decline; the soft decline requiring further verification before accepting the transaction. In some implementations, a buffer value for the transaction counter may be modified to avoid declining legitimate transactions.

In some examples, the contactless card can selectively communicate information depending upon the recipient device. Once tapped, the contactless card can recognize the device to which the tap is directed, and based on this recognition the contactless card can provide appropriate data for that device. This advantageously allows the contactless card to transmit only the information required to complete the instant action or transaction, such as a payment or card authentication. By limiting the transmission of data and avoiding the transmission of unnecessary data, both efficiency and data security can be improved. The recognition and selective communication of information can be applied to a various scenarios, including card activation, balance transfers, account access attempts, commercial transactions, and step-up fraud reduction.

If the contactless card tap is directed to a device running Apple's iOS® operating system, e.g., an iPhone, iPod, or iPad, the contactless card can recognize the iOS® operating system and transmit data appropriate data to communicate with this device. For example, the contactless card can provide the encrypted identity information necessary to authenticate the card using NDEF tags via, e.g., NFC. Similarly, if the contactless card tap is directed to a device running the Android® operating system, e.g., an Android® smartphone or tablet, the contactless card can recognize the Android® operating system and transmit appropriate and data to communicate with this device (such as the encrypted identity information necessary for authentication by the methods described herein).

As another example, the contactless card tap can be directed to a POS device, including without limitation a kiosk, a checkout register, a payment station, or other terminal. Upon performance of the tap, the contactless card can recognize the POS device and transmit only the information necessary for the action or transaction. For example, upon recognition of a POS device used to complete a commercial transaction, the contactless card can communicate payment information necessary to complete the transaction under the EMV standard.

In some examples, the POS devices participating in the transaction can require or specify additional information, e.g., device-specific information, location-specific information, and transaction-specific information, that is to be provided by the contactless card. For example, once the POS device receives a data communication from the contactless card, the POS device can recognize the contactless card and request the additional information necessary to complete an action or transaction.

In some examples the POS device can be affiliated with an authorized merchant or other entity familiar with certain contactless cards or accustomed to performing certain contactless card transactions. However, it is understood such an affiliation is not required for the performance of the described methods.

In some examples, such as a shopping store, grocery store, convenience store, or the like, the contactless card may be tapped to a mobile device without having to open an application, to indicate a desire or intent to utilize one or more of reward points, loyalty points, coupons, offers, or the like to cover one or more purchases. Thus, an intention behind the purchase is provided.

In some examples, the one or more applications may be configured to determine that it was launched via one or more tap gestures of the contactless card, such that a launch occurred at 3:51 pm, that a transaction was processed or took place at 3:56 pm, in order to verify identity of the user.

In some examples, the one or more applications may be configured to control one or more actions responsive to the one or more tap gestures. For example, the one or more actions may comprise collecting rewards, collecting points, determine the most important purchase, determine the least costly purchase, and/or reconfigure, in real-time, to another action.

In some examples, data may be collected on tap behaviors as biometric/gestural authentication. For example, a unique identifier that is cryptographically secure and not susceptible to interception may be transmitted to one or more backend services. The unique identifier may be configured to look up secondary information about individual. The secondary information may comprise personally identifiable information about the user. In some examples, the secondary information may be stored within the contactless card.

In some examples, the device may comprise an application that splits bills or check for payment amongst a plurality of individuals. For example, each individual may possess a contactless card, and may be customers of the same issuing financial institution, but it is not necessary. Each of these individuals may receive a push notification on their device, via the application, to split the purchase. Rather than accepting only one card tap to indicate payment, other contactless cards may be used. In some examples, individuals who have different financial institutions may possess contactless cards to provide information to initiate one or more payment requests from the card-tapping individual.

The following example use cases describe examples of particular implementations of the present disclosure. These are intended solely for explanatory purposes and not for purposes of limitation. In one case, a first friend (payor) owes a second friend (payee) a sum of money. Rather than going to an ATM or requiring exchange through a peer-to-peer application, payor wishes to pay via payee's smartphone (or other device) using a contactless card. Payee logs-on to the appropriate application on his smartphone and selects a payment request option. In response, the application requests authentication via payee's contactless card. For example, the application outputs a display requesting that payee tap his contactless card. Once payee taps his contactless card against the screen of his smartphone with the application enabled, the contactless card is read and verified. Next, the application displays a prompt for payor to tap his contactless card to send payment. After the payor taps his contactless card, the application reads the card information and transmits, via an associated processor, a request for payment to payor's card issuer. The card issuer processes the transaction and sends a status indicator of the transaction to the smartphone. The application then outputs for display the status indicator of the transaction.

In another example case, a credit card customer may receive a new credit card (or debit card, other payment card, or any other card requiring activation) in the mail. Rather than activating the card by calling a provided telephone number associated with the card issuer or visiting a website, the customer may decide to activate the card via an application on his or her device (e.g., a mobile device such as a smartphone). The customer may select the card activation feature from the application's menu that is displayed on a display of the device. The application may prompt the customer to tap his or her credit card against the screen. Upon tapping the credit card against the screen of the device, the application may be configured to communicate with a server, such as a card issuer server which activates the customer's card. The application may then display a message indicating successful activation of the card. The card activation would then be complete.

Figure 7:
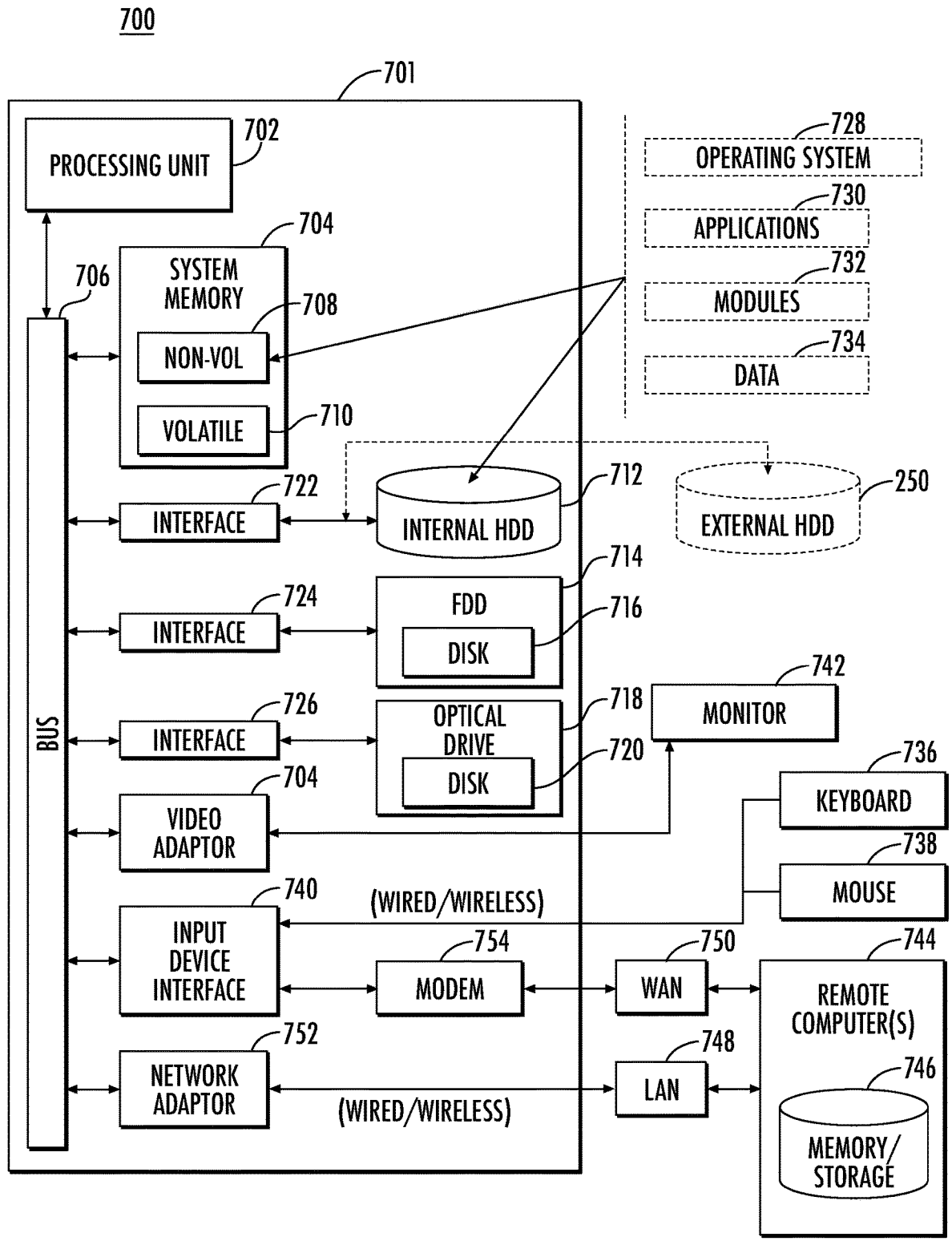
FIG. 7 depicts an exemplary computing system suitable for use with exemplary embodiments.

The above-described methods may be embodied as instructions on a computer readable medium or as part of a computing architecture. FIG. 7 illustrates an embodiment of an exemplary computing architecture 700 suitable for implementing various embodiments as previously described. In one embodiment, the computing architecture 700 may comprise or be implemented as part of an electronic device, such as a computer 701. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 702, a system memory 704 and a system bus 706. The processing unit 702 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 702.

The system bus 706 provides an interface for system components including, but not limited to, the system memory 704 to the processing unit 702. The system bus 706 can be any of several types of bus structure that may further interconnect to a memory bus (with or without a memory controller), a peripheral bus, and a local bus using any of a variety of commercially available bus architectures. Interface adapters may connect to the system bus 706 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile memory 708 and/or volatile memory 710. A basic input/output system (BIOS) can be stored in the non-volatile memory 708.

The computing architecture 700 may include various types of computer-readable storage media in the form of one or more lower speed memory units, including an internal (or external) hard disk drive (HDD) 712, a magnetic floppy disk drive (FDD) 714 to read from or write to a removable magnetic disk 716, and an optical disk drive 718 to read from or write to a removable optical disk 720 (e.g., a CD-ROM or DVD). The HDD 712, FDD 714 and optical disk drive 720 can be connected to the system bus 706 by an HDD interface 722, an FDD interface 724 and an optical drive interface 726, respectively. The HDD interface 722 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 708, 712, including an operating system 728, one or more application programs 730, other program modules 732, and program data 734. In one embodiment, the one or more application programs 730, other program modules 732, and program data 734 can include, for example, the various applications and/or components of the messaging system 500.

A user can enter commands and information into the computer 701 through one or more wire/wireless input devices, for example, a keyboard 736 and a pointing device, such as a mouse 738. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 702 through an input device interface 740 that is coupled to the system bus 706, but can be connected by other interfaces such as a parallel port, IEEE 694 serial port, a game port, a USB port, an IR interface, and so forth.

A monitor 742 or other type of display device is also connected to the system bus 706 via an interface, such as a video adaptor 744. The monitor 742 may be internal or external to the computer 701. In addition to the monitor 742, a computer typically includes other peripheral output devices, such as speakers, printers, and so forth.

The computer 701 may operate in a networked environment using logical connections via wire and/or wireless communications to one or more remote computers, such as a remote computer 744. The remote computer 744 can be a workstation, a server computer, a router, a personal computer, portable computer, microprocessor-based entertainment appliance, a peer device or other common network node, and typically includes many or all of the elements described relative to the computer 701, although, for purposes of brevity, only a memory/storage device 746 is illustrated. The logical connections depicted include wire/wireless connectivity to a local area network (LAN) 748 and/or larger networks, for example, a wide area network (WAN) 750. Such LAN and WAN networking environments are commonplace in offices and companies, and facilitate enterprise-wide computer networks, such as intranets, all of which may connect to a global communications network, for example, the Internet.

When used in a LAN networking environment, the computer 701 is connected to the LAN 748 through a wire and/or wireless communication network interface or adaptor 752. The adaptor 752 can facilitate wire and/or wireless communications to the LAN 748, which may also include a wireless access point disposed thereon for communicating with the wireless functionality of the adaptor 752.

When used in a WAN networking environment, the computer 701 can include a modem 754, or is connected to a communications server on the WAN 750, or has other means for establishing communications over the WAN 750, such as by way of the Internet. The modem 754, which can be internal or external and a wire and/or wireless device, connects to the system bus 706 via the input device interface 740. In a networked environment, program modules depicted relative to the computer 701, or portions thereof, can be stored in the remote memory/storage device 746. It will be appreciated that the network connections shown are exemplary and other means of establishing a communications link between the computers can be used.

The computer 701 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
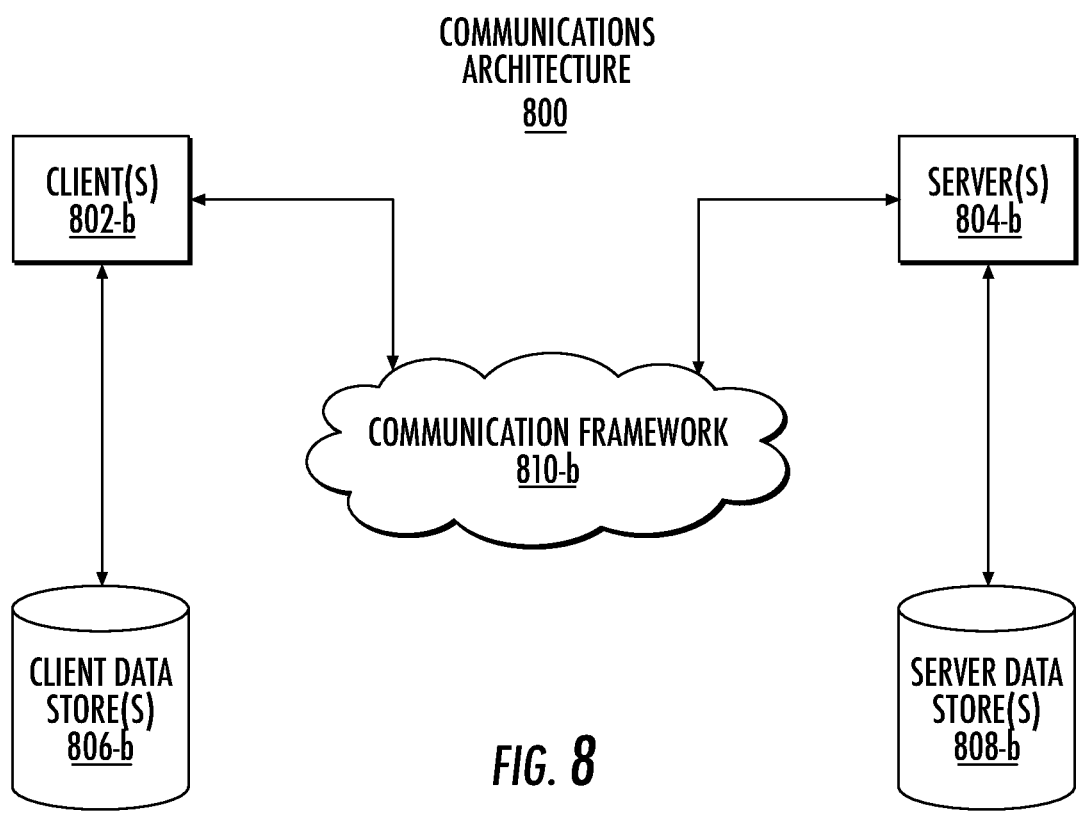
FIG. 8 depicts an exemplary network environment suitable for use with exemplary embodiments.

FIG. 8 is a block diagram depicting an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The clients 802 may implement the client device 510. The servers 804 may implement the server device 526. The clients 802 and the servers 804 are operatively connected to one or more respective client data stores 806 and server data stores 808 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.8a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computing device comprising:
   a processor circuit;
   a memory coupled with the processor circuit, the memory configured to store instructions, when executed by the processor circuit, to cause the processor circuit to:
     perform a first near-field communication (NFC) communication with a contactless card, the NFC communication to occur with the contactless card when the contactless card is within an NFC communication range of the computing device;
     in response to the first NFC communication with the contactless card, launch an application or download and launch the application;
     perform, via the application executing on the processor circuit, a second NFC communication comprising a cryptogram from the contactless card, wherein the cryptogram is encrypted by the contactless card utilizing a session key derived from a diversified key and including data;
     send, by the application, the cryptogram, without decrypting the cryptogram including the data, to a server to activate the contactless card; and
     receive, by the application, a response from the server, the response to indicate whether the contactless card is successfully activated or not successfully activated.

2. The computing device of claim 1, wherein the cryptogram is comprised in a message in an NFC Data Exchange Format (NDEF).

3. The computing device of claim 2, wherein the message is in a format in accordance with an International Organization for Standardization (ISO)/International Electrotechnical Commission (IEC) 14443 format.

4. The computing device of claim 1, wherein the instructions are further configured to cause the processor circuit to:
   determine to install the application to send the cryptogram, and receive the response;
   initiate automatic download and installation of the application to send the cryptogram, and receive the response.

5. The computing device of claim 1, wherein the instructions are further configured to cause the processor circuit to:
   determine to execute the application based on the first NFC communication; and
   initiate execution of the application to send the cryptogram, and receive the response.

6. The computing device of claim 4, wherein at least a portion of the instructions are implemented as an operating system and are configured to install the application via a store application.

7. The computing device of claim 1, comprising:
   a display device; and
   wherein the instructions are further configured to cause the processor circuit to:
     present an indication on the display device to tap the contactless card on a surface of the computing device.

8. The computing device of claim 7, wherein the instructions are further configured to cause the processor circuit to:
   present a menu in a graphical user interface (GUI) of the application on the display device, the menu comprising a user option to activate the contactless card; and
   present the indication to tap the contactless card based on an input selection of the user option to activate the contactless card and perform the second NFC communication.

9. The computing device of claim 7, wherein the instructions are further configured to cause the processor circuit to present a second indication as to whether the contactless card is activated or not activated based on the response received from the server.

10. The computing device of claim 1, wherein the application is a web browser configured to present a webpage associated with the contactless card.

11. The computing device of claim 1, wherein the server is associated with the contactless card.

12. A computer-implemented method, comprising:
receiving, by a computing device, a first message from a contactless card based on the contactless card coming withing a wireless communication distance of the computing device;
in response to the first message, launching, by the computing device, an application, or downloading and launching, by the computing device, the application;
receiving, by the application executing on the computing device, a second message from the contactless card, the second message comprising a cryptogram comprising data to activate the contactless card, wherein the cryptogram is generated by the contactless card utilizing a session key derived from a diversified key;
communicating, by the application, the cryptogram comprising the data to a server to activate the contactless card;
receiving, by the application, a response from the server, the response to indicate whether the contactless card is successfully activated or not successfully activated; and
causing, by the application, presentation of a graphical element in a graphical user interface (GUI) display on the computing device to indicate whether the contactless card is activated or not activated based on the response received from the server.

13. The computer-implemented method of claim 12, wherein the first and second messages are in an NFC Data Exchange Format (NDEF).

14. The computer-implemented method of claim 12, wherein the first and second messages are in a format in accordance with an International Organization for Standardization (ISO)/International Electrotechnical Commission (IEC) 14443 format.

15. The computing device of claim 1, wherein the data included in the cryptogram comprises a dummy transaction value recognizable by the server.

16. The computer-implemented method of claim 12, further comprising:
after receipt of a response from the server indicating the contactless card is successfully activated, communicating, by the application, second data to the contactless card,
wherein the second data comprises at least one selected from the group of loyalty points, reward points, and healthcare information.

17. A non-transitory computer-readable storage medium containing instructions that, when executed by a computing device, cause perform procedures comprising:
receiving, by the computing device, a first message from a contactless card based on the contactless card coming withing a wireless communication distance of the computing device;
in response to the first message, launching, by the computing device, an application, or downloading and launching, by the computing device, the application;
receiving, by the application executing on the computing device, a second message from the contactless card, the second message comprising a cryptogram;
comprising data to activate the contactless card, wherein the cryptogram is generated by the contactless card utilizing a session key derived from a diversified key;
communicating, by the application, the cryptogram comprising the data to a server to activate the contactless card;
receiving, by the application, a response from the server, the response to indicate whether the contactless card is successfully activated or not successfully activated.

18. The non-transitory computer-readable storage medium of claim 17, the procedures further comprising causing, by the application, presentation of a graphical element in a graphical user interface (GUI) display on the computing device to indicate whether the contactless card is activated or not activated based on the response received from the server.

19. The non-transitory computer-readable storage medium of claim 17, wherein the application is configured to split a bill among a plurality of users.

20. The non-transitory computer-readable storage medium of claim 19, wherein:
the application transmits a push notification to a plurality of computing devices, and
each of the plurality of computing devices is associated with one of the plurality of users.

* * * * *